US012595327B2

(12) United States Patent
Herr et al.

(10) Patent No.: US 12,595,327 B2
(45) Date of Patent: Apr. 7, 2026

(54) IMIDE-LINKED POLYMERIC PHOTOINITIATORS

(71) Applicant: Arkema France, Colombes (FR)

(72) Inventors: Donald Herr, Exton, PA (US); Thomas Hazell, Exton, PA (US)

(73) Assignee: Arkema France, Puteaux (FR)

( * ) Notice: Subject to any disclaimer, the term of this patent is extended or adjusted under 35 U.S.C. 154(b) by 548 days.

(21) Appl. No.: 18/014,497

(22) PCT Filed: Jul. 12, 2021

(86) PCT No.: PCT/IB2021/000477

§ 371 (c)(1),
(2) Date: Jan. 5, 2023

(87) PCT Pub. No.: WO2022/008975

PCT Pub. Date: Jan. 13, 2022

(65) Prior Publication Data

US 2023/0265231 A1 Aug. 24, 2023

Related U.S. Application Data

(60) Provisional application No. 63/050,487, filed on Jul. 10, 2020.

(51) Int. Cl.
*C08F 236/06* (2006.01)
*C08F 222/06* (2006.01)

(52) U.S. Cl.
CPC .......... *C08F 236/06* (2013.01); *C08F 222/06* (2013.01); *C08F 2810/50* (2013.01)

(58) Field of Classification Search
CPC .... C08F 8/30; C08F 8/46; C08F 36/04; C08F 36/06; C08F 236/04; C08F 236/06
See application file for complete search history.

(56) References Cited

U.S. PATENT DOCUMENTS

| | | | | |
|---|---|---|---|---|
| 3,429,852 A | | 2/1969 | Skoultchi et al. | |
| 4,587,276 A | | 5/1986 | Lien et al. | |
| 7,157,535 B2 | | 1/2007 | Herr et al. | |
| 7,709,545 B2 | | 5/2010 | Hoyle et al. | |
| 7,745,505 B2 | | 6/2010 | Liu et al. | |
| 7,795,364 B2 | | 9/2010 | Herr et al. | |
| 7,799,884 B2 | | 9/2010 | Herr et al. | |
| 9,353,211 B2 | | 5/2016 | Madsen et al. | |
| 9,371,308 B2 | | 6/2016 | Madsen et al. | |
| 11,034,779 B2 | | 6/2021 | Hoj et al. | |
| 2003/0236425 A1 | * | 12/2003 | Herr | C08F 8/32 556/451 |
| 2013/0059940 A1 | * | 3/2013 | Nielsen | C08F 2/50 522/35 |

FOREIGN PATENT DOCUMENTS

| | | | |
|---|---|---|---|
| CN | 1858078 | * | 11/2006 |
| WO | WO2011160636 A2 | | 12/2011 |

OTHER PUBLICATIONS

Translation of CN 1858078 (Year: 2006).*
Wu, Journal of Applied Polymer Science, vol. 118, Issue 3, Nov. 5, 2010, p. 1675-1682 (Year: 2010).*
Na, Macromolecular Research, vol. 22, No. 9, p. 958-962 (2014) (Year: 2014).*
Wu, Materials Science and Engineering C 30 (2010) 1030-1037 (Year: 2010).*
Fouassier, J.P. Photoinitiation, Photopolymerization and Photocuring, Fundamentals and Applications, 1995, Hanser Publishers; David C. Demarteu et al., pp. 71-73.
Hur Youngjune et al., “Synthesis of Imide UV Monomers for Application to Interdielectric Layer of TFT-LCD Array”, Molecular Crystals and Liquid Crystals, vol. 470 No. 1, Aug. 10, 2007 pp. 199-205.
Fouassier, J.P. Eds. Radiation Curing in Science and Technology, 1993, Elsevier Appl Science, vol. 2 pp. 283-321 C. Carlini and L. Angiolini.
Fouassier, J.P. Eds. Radiation Curing in Science and Technology, 1993, Elsevier Appl Science, vol. 2 pp. 304-320 C. Carlini and L. Angiolini.
Photolysis of Polyvinylbenzophenone; 1969, 10, pp. 21-27 David C. Demarteu et al.
Polymer 1983 vol. May 24, 1983—“Polymers containing side-chain benzophenone chromophores: a new class of highly efficient polymerization photoinitiators”; C. Carlini et al pp. 599-606.

* cited by examiner

*Primary Examiner* — Robert C Boyle
(74) *Attorney, Agent, or Firm* — Christopher R. Lewis

(57) ABSTRACT

Imide-linked polymeric photoinitiators and compositions useful in the preparation of such polymeric photoinitiators and to the use of these polymers in, e.g., UV curable adhesives, UV curable coating compositions and UV curable encapsulants.

19 Claims, 3 Drawing Sheets

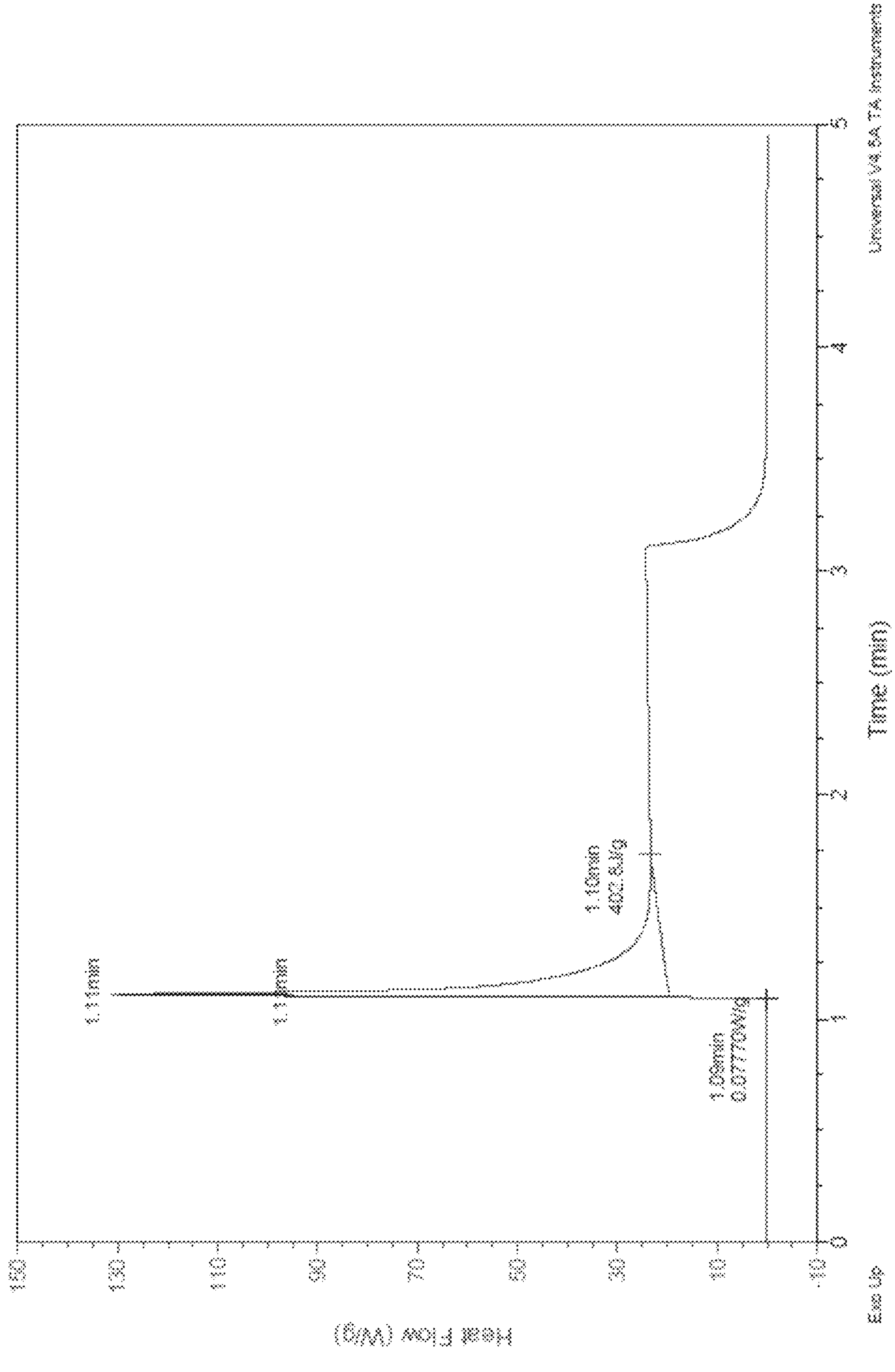
FIG. 1. PhotoDSC; 97 parts SR355/3 parts TPO

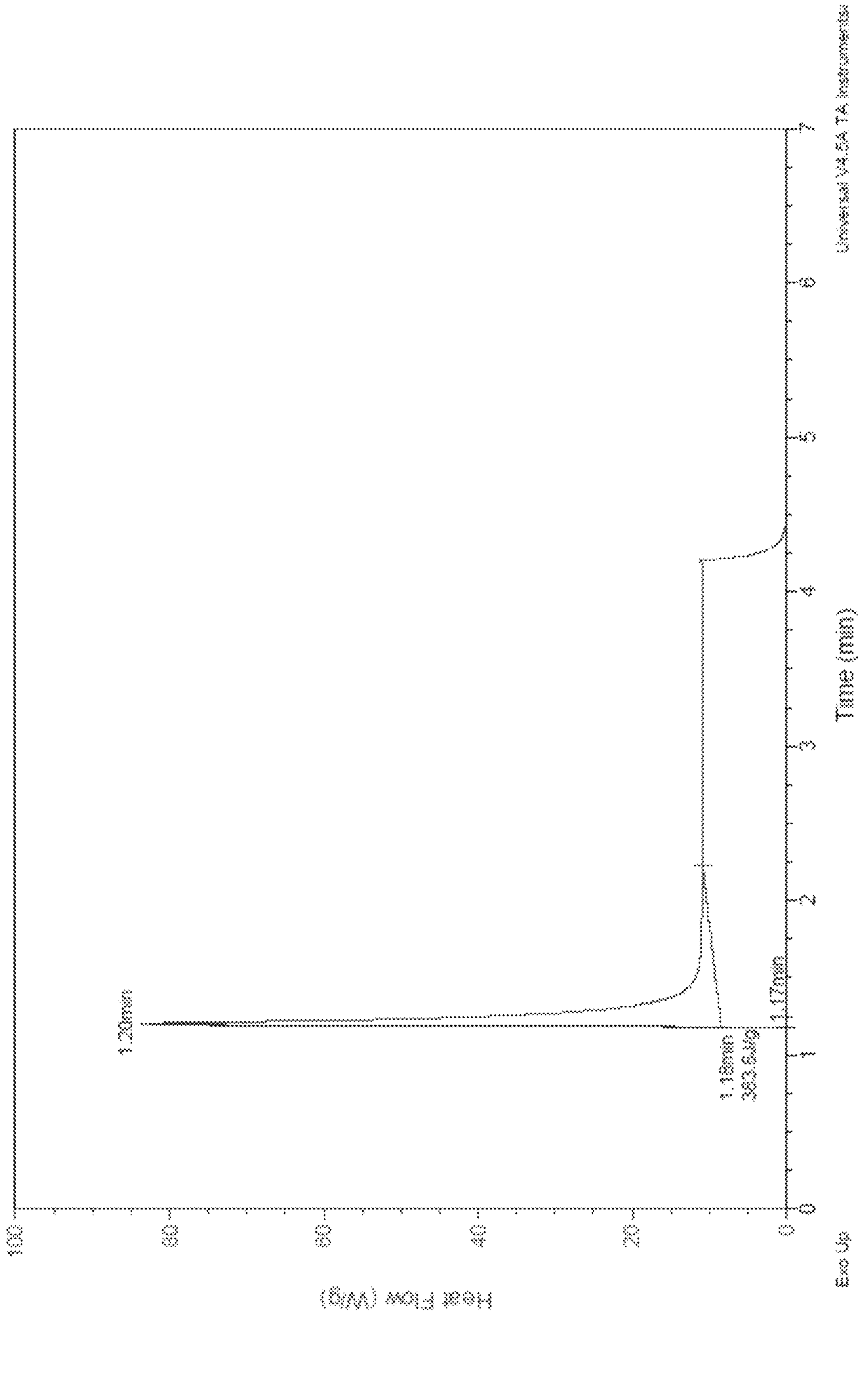
FIG. 2. PhotoDSC; 95 SR355/3 CQ/2 EHAB

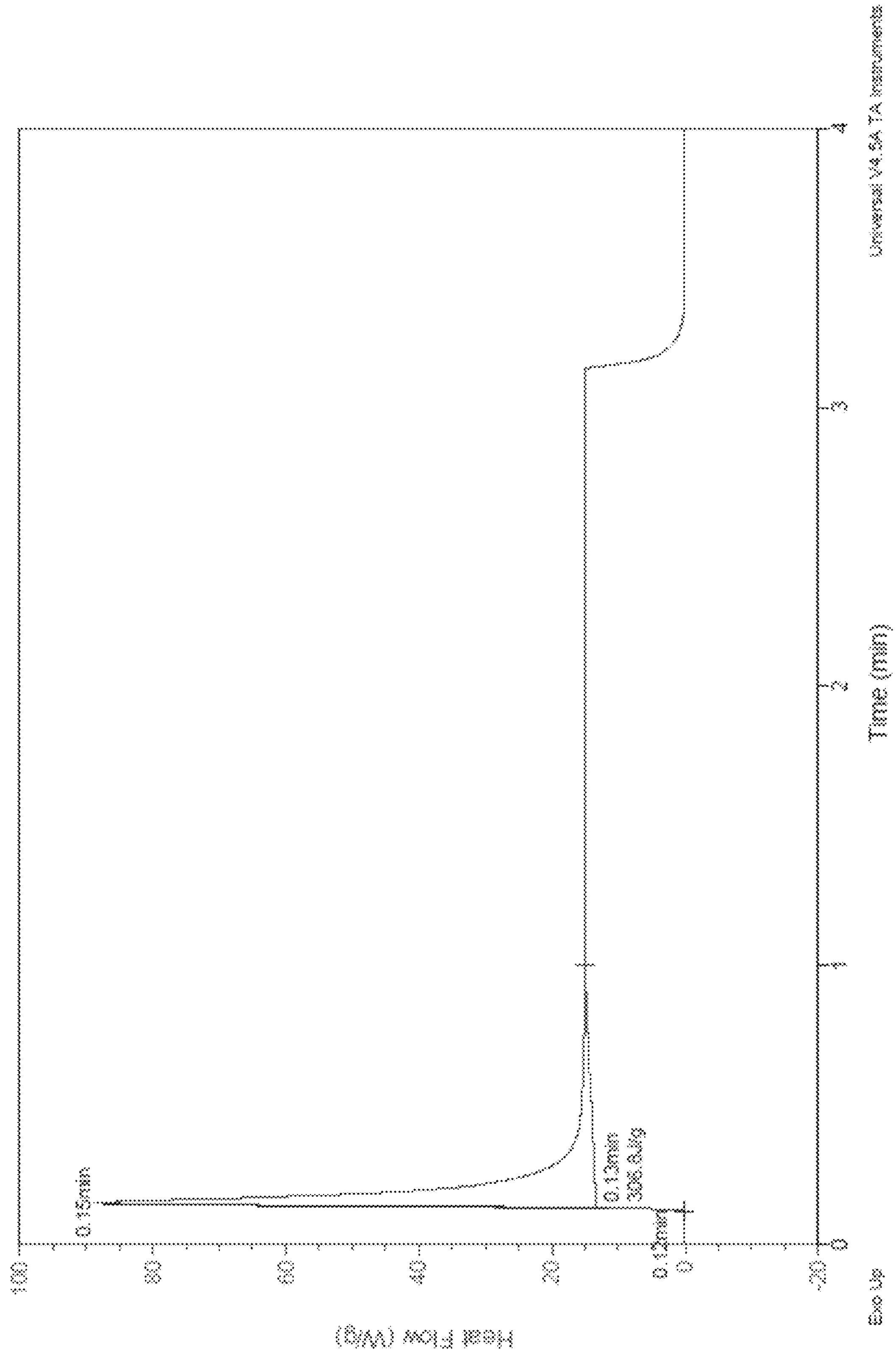
FIG. 3. PhotoDSC; 92 parts SR355/8 parts Polymeric Photoinitiator (1)

IMIDE-LINKED POLYMERIC PHOTOINITIATORS

CROSS-REFERENCE TO RELATED APPLICATIONS

This application is a U.S. national stage application under 35 U.S.C. § 371 of international application number PCT/IB2021/000477, filed Jul. 12, 2021, which claims priority to U.S. patent application Ser. No. 63/050,487, filed Jul. 10, 2020.

BACKGROUND

The invention relates to imide-linked polymeric photoinitiators and compositions useful in the preparation of such polymeric photoinitiators and to the use of these polymers in, e.g., radiation curable adhesives, radiation curable coating compositions and radiation curable encapsulants.

The primary function of a photoinitiator is to generate polymerization initiating radicals when the photoinitiator is irradiated with ultraviolet (UV) light. Photoinitiators are classified into "Type I" (or photocleavage) photoinitiators and "Type II" (or H-abstraction) photoinitiators according to the pathways by which the effective initiating radicals are generated.

In contrast to photocleavage photoinitiators which are decomposed by UV light directly into radicals which are effective in initiating polymerization, H-abstraction photoinitiators require a hydrogen donor, or more generally a source of abstractable hydrogens in order to generate radicals that are effective in initiating polymerization. The process of H-abstraction is usually a bimolecular reaction requiring the encounter of a photoinitiator and a hydrogen-donor. Any source of abstractable hydrogens may be useful (e.g., any structure that yields a stable radical after H-abstraction may serve as a "H donor") and such sources include amines, thiols, polyethers, unsaturated rubbers such as polybutadiene or polyisoprene, and alcohols.

The basic photochemistry and photophysics of both α-cleavage (Type I) and H-abstraction (Type II) photoinitiators has been well studied and utilized industrially in UV curable systems (see (a) Cowan, D. O.; Drisko, R. L. Elements of Organic Photochemistry, 1976, Plenum Press, chapters 3 and 4. (b) Turro, N. J. Modern Molecular Photochemistry, 1991, University Science Books, chapters 7, 10, and 13.). One well recognized problem with the use of UV curable systems for coating and adhesive applications is the fate of the photo-by products created by the curing process. In the case of typical α-cleavage type photoinitiators, the production of benzaldehyde (and often related compounds) is often a significant concern from both a toxicity and product odor standpoint. Such concerns become especially important when the use of radiation curable materials is considered for applications that involve skin or food contact. Various effective approaches have been taken to reduce the odor and extractable by-product content of UV curable materials. One approach has been the use of copolymerizable or polymeric photoinitiators which are chemically incorporated into the cured polymeric matrix as opposed to remaining in the irradiated material as a small molecule (see (a) Fouassier, J. P.; Rabek, J. F., Eds. Radiation Curing in Science and Technology, 1993, Elsevier Appl. Sci., vol. 2, 283-321. (b) Fouassier, J. P. Photoinitiation, Photopolymerization and Photocuring, Fundamentals and Applications, 1995, Hanser Publishers, 71-73.). Unfortunately, when utilizing α-cleavage photoinitiators at least one of the cleavage by-products still remains as a small molecule even if the other fragment is incorporated into a polymeric component of the system. Thus, although extractable and odorous by-products can be reduced through the use of polymeric or polymerizable Type I photoinitiators, they are not eliminated entirely.

The use of polymerizable or polymeric H-abstraction type photoinitiators, in principle, presents the possibility of creating a system with zero extractable components related to the photoinitiation system. Various groups have presented systems based upon poly(vinyl benzophenone) and its copolymers or polymers derived from acrylated benzophenone derivatives (see (a) David, C.; Demarteu, W.; Geuskens, G. Polymer, 1969, 10, 21-27. (b) Carlini, C.; Ciardelli, F.; Donati, D.; Gurzoni, F. Polymer, 1983, 24, 599-606.). The direct use of acrylated benzophenones has also been disclosed (U.S. Pat. No. 3,429,852). Unfortunately, these Type II systems often suffer from issues related to photoefficiency relative to analogous small molecule photoinitation systems. Thus, it is often most desirable to use polymeric photoinitiators as opposed to polymerizable photoinitiators.

U.S. Pat. No. 7,795,364 discloses amide-linked polymerizable photoinitiators. Although effective, the amide-linked photoinitiators are susceptible to cleavage at the amide linkage and, therefore, stability may be compromised. Moreover, the amide-linked photoinitiators are less soluble in polymeric systems and tend to add an unwanted viscosity increase.

Accordingly, there continues to be a need in the art for improved H-abstraction photoinitiators useful in the manufacture of radiation curable adhesives and coating formulations that do not suffer from the above-identified drawbacks and still produce low odor products with fewer (or no) inherent extractable photochemical by-products. The present development fulfils this need.

BRIEF SUMMARY

In one aspect, disclosed herein is an imide-linked photoinitiator selected from the group consisting of structure (I) and (II):

(I)

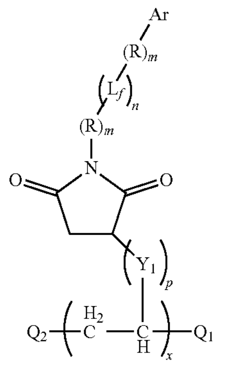

and (II)

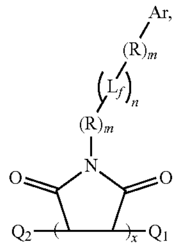

wherein $Q_1$ and $Q_2$ are each a small molecule or polymer, wherein $Q_1$ and $Q_2$ can be the same or different; Ar is selected from the group consisting of

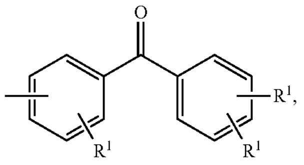

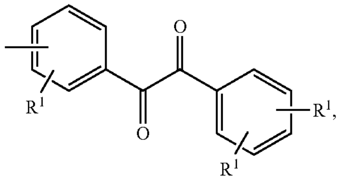

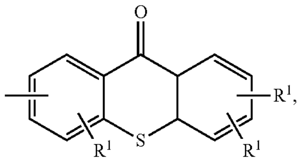

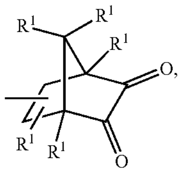

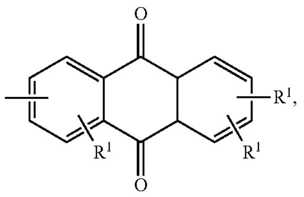

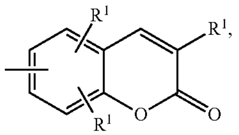

and

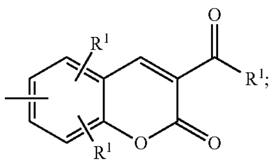

R is a linear or branched alkyl group, cycloalkyl, alkylenoxy, alkenyl or aryl group, an alkyl group containing a heteroatom or a carbonyl group; $R^1$ is independently a linear or branched alkyl group, a cycloalkyl, an alkylenoxy, an alkenyl, an aryl group, an alkyl group containing a heteroatom, a carbonyl group, H, OR, $NR_2$, SR, F, Cl, Br or I; $Y_1$ is a linear or branched ($C_1$ to $C_8$) alkylene group or a bond; $L_f$ is a functional linkage selected from the group consisting of an ether, an ester, an amide, a urethane, and a carbonate; m=0 or 1; n=0 or 1; p=0 or 1; and x=1-100.

In another aspect, disclosed is a composition comprising an imide-linked photoinitiator selected from the group consisting of structure (I) and (II):

(I)

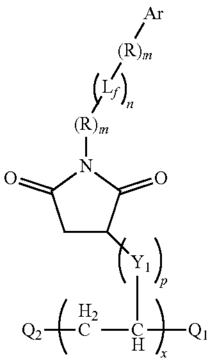

and (II)

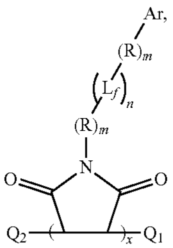

wherein $Q_1$ and $Q_2$ are each a small molecule or polymer, wherein $Q_1$ and $Q_2$ can be the same or different; Ar is selected from the group consisting of

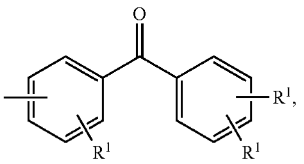

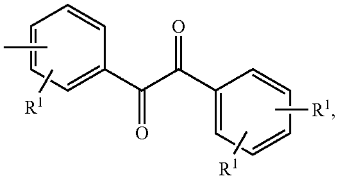

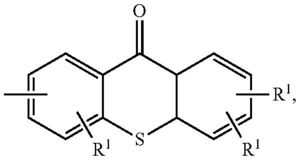

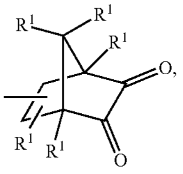

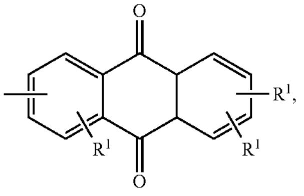

-continued

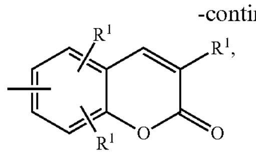

, and

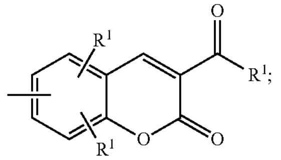

;

R is a linear or branched alkyl group, cycloalkyl, alkylenoxy, alkenyl or aryl group, an alkyl group containing a heteroatom or a carbonyl group; $R^1$ is independently a linear or branched alkyl group, a cycloalkyl, an alkylenoxy, an alkenyl, an aryl group, an alkyl group containing a heteroatom, a carbonyl group, H, OR, $NR_2$, SR, F, Cl, Br or I; $Y_1$ is a linear or branched ($C_1$ to $C_8$) alkylene group or a bond; $L_f$ is a functional linkage selected from the group consisting of an ether, an ester, an amide, a urethane, and a carbonate; m=0 or 1; n=0 or 1; p=0 or 1; and x=1-100.

BRIEF DESCRIPTION OF DRAWINGS

FIG. 1 is a DSC plot illustrating the photoDSC performance of a commercially available Type I TPO composition;

FIG. 2 is a DSC plot illustrating the photoDSC performance of a commercially available CQ/EHAB Type II composition; and FIG. 3 is a DSC plot illustrating the photoDSC performance of a composition as disclosed herein.

DETAILED DESCRIPTION

All documents cited herein are incorporated in their entireties by reference.

Embodiments described herein can be understood more readily by reference to the following detailed description, examples, and drawings. Elements, apparatus and processes described herein, however, are not limited to the specific embodiments presented in the detailed description, examples, and drawings. It should be recognized that these embodiments are merely illustrative of the principles of the present disclosure. Numerous modifications and adaptations will be readily apparent to those of skill in the art without departing from the spirit and scope of the disclosure.

In addition, all ranges disclosed herein are to be understood to encompass any and all subranges subsumed therein. For example, a stated range of "1.0 to 10.0" should be considered to include any and all subranges beginning with a minimum value of 1.0 or more and ending with a maximum value of 10.0 or less, e.g., 1.0 to 5.3, or 4.7 to 10.0, or 3.6 to 7.9.

All ranges disclosed herein are also to be considered to include the end points of the range, unless expressly stated otherwise. For example, a range of "between 5 and 10" or "from 5 to 10" or "5-10" should generally be considered to include the end points 5 and 10.

When the phrase "up to" is used in connection with an amount or quantity, it is to be understood that the amount is at least a detectable amount or quantity. For example, a material present in an amount "up to" a specified amount can be present from a detectable amount and up to and including the specified amount.

Ranges may be expressed herein as from "about" one particular value, and/or to "about" another particular value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements), etc.

As used herein, the term "alkyl" means a saturated hydrocarbon group which is straight-chained or branched. In some embodiments, the alkyl group has from 1 to 20 carbon atoms, from 2 to 20 carbon atoms, from 1 to 10 carbon atoms, from 2 to 10 carbon atoms, from 1 to 8 carbon atoms, from 2 to 8 carbon atoms, from 1 to 6 carbon atoms, from 2 to 6 carbon atoms, from 1 to 4 carbon atoms, from 2 to 4 carbon atoms, from 1 to 3 carbon atoms, or 2 or 3 carbon atoms. Examples of alkyl groups include, but are not limited to, methyl (Me), ethyl (Et), propyl (e.g., n-propyl and isopropyl), butyl (e.g., n-butyl, t-butyl, isobutyl), pentyl (e.g., n-pentyl, isopentyl, neopentyl), hexyl, isohexyl, heptyl, octyl, nonyl, 4,4-dimethylpentyl, 2,2,4-trimethylpentyl, decyl, undecyl, dodecyl, 2-methyl-1-propyl, 2-methyl-2-propyl, 2-methyl-1-butyl, 3-methyl-1-butyl, 2-methyl-3-butyl, 2-methyl-1-pentyl, 2,2-dimethyl-1-propyl, 3-methyl-1-pentyl, 4-methyl-1-pentyl, 2-methyl-2-pentyl, 3-methyl-2-pentyl, 4-methyl-2-pentyl, 2,2-dimethyl-1-butyl, 3,3-dimethyl-1-butyl, 2-ethyl-1-butyl, and the like. The term "alkylene" means a divalent alkyl linking group. Example of alkylenes include, but are not limited to, methylene ($-CH_2-$), ethylene ($-CH_2-CH_2-$), and propylene ($-CH_2-CH_2-CH_2-$).

As used herein, the term "alkenyl" means a straight or branched alkyl group having 2 to 20 carbon atoms and having one or more double carbon-carbon bonds. In some embodiments, the alkenyl group has from 2 to 10 carbon atoms, from 2 to 8 carbon atoms, from 2 to 6 carbon atoms, from 2 to 4 carbon atoms, from 3 to 10 carbon atoms, from 3 to 8 carbon atoms, from 3 to 6 carbon atoms, or 3 or 4 carbon atoms. Examples of alkenyl groups include, but are not limited to, ethenyl, 1-propenyl, 2-methyl-1-propenyl, 2-propenyl, 1-butenyl, 2-butenyl, and the like. The term "alkenylene" means a divalent alkenyl linking group.

As used herein, the term "amino" means $—NH_2$.

As used herein, the term "aryl" means a monocyclic, bicyclic, or polycyclic (e.g., having 2, 3 or 4 fused rings) aromatic hydrocarbon. In some embodiments, the aryl group has from 6 to 20 carbon atoms or from 6 to 10 carbon atoms. Examples of aryl groups include, but are not limited to, phenyl, naphthyl, anthracenyl, phenanthrenyl, indanyl, indenyl, and tetrahydronaphthyl, and the like. The term "arylene" means a divalent aryl linking group.

As used herein, the term "cycloalkyl" means non-aromatic cyclic hydrocarbons including cyclized alkyl, alkenyl, and alkynyl groups that have up to 20 ring-forming carbon atoms. Cycloalkyl groups have from 3 to 15 ring-forming carbon atoms, from 3 to 10 ring-forming carbon atoms, from 3 to 8 ring-forming carbon atoms, from 3 to 6 ring-forming carbon atoms, from 4 to 6 ring-forming carbon atoms, from 3 to 5 ring-forming carbon atoms, or 5 or 6 ring-forming carbon atoms. Ring-forming carbon atoms of a cycloalkyl group can be optionally substituted by oxo or sulfido. Cycloalkyl groups include, but are not limited to, monocyclic or polycyclic ring systems such as fused ring systems, bridged ring systems, and spiro ring systems. In some embodiments, polycyclic ring systems include 2, 3, or 4 fused rings. Examples of cycloalkyl groups include, but are not limited to, cyclopropyl, cyclobutyl, cyclopentyl, cyclohexyl, cycloheptyl, cyclooctyl, cyclononyl, cyclopentenyl, cyclohexenyl, cyclohexadienyl, cycloheptatrienyl, norbornyl, norpinyl, norcarnyl, adamantyl, and the like. Cycloalkyl groups can also have one or more aromatic rings fused (having a bond in common with) to the cycloalkyl ring such as, for example, benzo or thienyl derivatives of pentane, pentene, hexane, and the like (e.g., 2,3-dihydro-1 H-indene-1-yl, or 1 H-inden-2(3H)-one-1-yl). The term "cycloalkylene" means a divalent cycloalkyl linking group.

As used herein, the term "heteroaryl" means an aromatic heterocycle having up to 20 ring-forming atoms (e.g., C) and having at least one heteroatom ring member (ring-forming atom) such as sulfur, oxygen, or nitrogen. In some embodiments, the heteroaryl group has at least one or more heteroatom ring-forming atoms, each of which are, independently, sulfur, oxygen, or nitrogen. In some embodiments, the heteroaryl group has from 3 to 20 ring-forming atoms, from 3 to 10 ring-forming atoms, from 3 to 6 ring-forming atoms, or from 3 to 5 ring-forming atoms. In some embodiments, the heteroaryl group contains 2 to 14 carbon atoms, from 2 to 7 carbon atoms, or 5 or 6 carbon atoms. In some embodiments, the heteroaryl group has 1 to 4 heteroatoms, 1 to 3 heteroatoms, or 1 or 2 heteroatoms. Heteroaryl groups include monocyclic and polycyclic (e.g., having 2, 3 or 4 fused rings) systems. Examples of heteroaryl groups include, but are not limited to, pyridyl, pyrimidinyl, pyrazinyl, pyridazinyl, pyridinyl (including 2-aminopyridine), triazinyl, furyl, quinolyl, isoquinolyl, thienyl, imidazolyl, thiazolyl, indolyl (such as indol-3-yl), pyrryl, oxazolyl, benzofuryl, benzothienyl, pyrazolyl, benzthiazolyl, isoxazolyl, triazolyl (including 1,2,4-triazole, 1,2,3-triazole, and 5-amino-1,2,4-triazole), tetrazolyl, indazolyl, isothiazolyl, 1,2,4-thiadiazolyl, benzothienyl, purinyl, carbazolyl, isoxazolyl, benzimidazolyl, indolinyl, pyranyl, pyrazolyl, triazolyl, oxadiazolyl (including 1,2,3-oxadiazole, 1,2,4-oxadiazole, 1,2,5-oxadiazole, 3-amino-1,2,4-oxadiazole, 1,3,4-oxadiazole), thianthrenyl, indolizinyl, isoindolyl, isobenzofuranyl, pyrrolyl, benzoxazolyl, xanthenyl, 2H-pyrrolyl, 3H-indolyl, 4H-quinolizinyl, phthalazinyl, acridinyl, naphthyridinyl, quinazolinyl, phenanthridinyl, perimidinyl, phenanthrolinyl, phenazinyl, isothiazolyl, phenothiazinyl, isoxazolyl, furazanyl, phenoxazinyl groups, and the like.

As used herein, the term "alkylenoxy" or "oxyalkylene" means a straight or branched chain radical (i.e. linking group) of one to six carbon atoms linked to an oxygen atom, including but not limited to, methylenoxy, ethylenoxy, propylenoxy, isopropylenoxy, butylenoxy, isobutylenoxy, t-butylenoxy, pentylenoxy, and hexylenoxy. The term "polyoxyalkylene" means a linking group comprising a plurality of oxyalkylene repeating units, in particular a plurality of oxyethylene ($—O—CH_2—CH_2—$) and/or oxypropylene ($—O—CH(CH_3)—CH_2—$ or $—O—CH_2—CH(CH_3)—$) repeating units. A polyoxylalkylene may comprise a moiety of formula $\text{-Alk-(0-Alk)}_q\text{-O—}$ wherein each Alk is independently an alkylene, in particular ethylene or propylene, and q is 1 to 100.

As used herein, the term "carbamate," alone or in combination, refers to an ester of carbamic acid (—NHCOO—) which may be attached to the parent molecular moiety from either the nitrogen or acid end, and which may be optionally substituted. The term carbamate and urethane are known as the same group to those skilled in the art. The term "urethane linkage" refers to —NH—C(=O)—O— or —O—C(=O)—NH—.

As used herein, the term "carbonate" refers to a moiety containing the group —OC(O)O—. The term "carbonate linkage" refers to —O—C(=O)—O—.

As used herein, the term "carboxy" refers to a group represented by the formula $—OO_2H$.

As used herein, the term "ester" refers to a group —C(O)OR. The term "ester linkage" refers to —C(=O)—O— or —O—C(=O)—.

As used herein, the term "ether" refers to a hydrocarbyl group linked through an oxygen to another hydrocarbyl group having the general formula R—O—R. Ethers may be either symmetrical or unsymmetrical. The term "ether linkage" refers to —O—.

The term "amide linkage" refers to —NH—C(=O)— or —C(=O)—NH—.

As used herein, the term "molecular weight" means number average molecular weight unless expressly noted otherwise.

The present disclosure provides polymeric H-abstraction class photoinitiators, in particular rubber-bound H-abstraction photoinitiator compositions, and adhesives, coating compositions and the like comprising such polymeric photoinitiators.

The imide-containing polymeric H-abstraction class photoinitiators disclosed herein are prepared from polymeric or oligomeric precursors comprising a chromophore linked through to the polymer/oligomer backbone via an optional spacer unit. The spacer unit between the imide functional group and the chromophore can be any organic moiety, preferably straight and branched chain alkyl or aryl, possibly including (but not limited to) heteroatoms such as O, S, N and Si. The spacer unit can also possess pendant heteroatom-containing substituents such as, but not limited to, alkoxy, mercaptoalkyl, amino and alkylamino. These functional precursors are subsequently covalently attached to small molecules or polymers to produce the inventive polymeric photoinitiator molecules disclosed herein.

The functionalized chromophores of the invention are attached to small molecules or polymers via an imide-containing linking group. The small molecules or polymers preferably contain groups that are reactive with the functional group present on the chromophore.

It is preferable to graft one or more of the functional chromophores to a polymeric material to produce a polymeric photoinitiator. For example, functional chromophores may be grafted to an unsaturated polymer such as poly (butadiene) by reactions known in the art. The resulting polymeric photoinitiators will often contain more than one covalently linked chromophore per polymer chain, and the average number of chromophores per chain can be controlled through stoichiometry. In cases where the polymeric photoinitiator may also participate in UV crosslinking reactions as well as acting as a photoinitiator, it is often preferable that the polymeric photoinitiator contain more than two chromophore groups. It is often preferable to have many chromophore groups pendant to a single polymer chain in order to provide high levels of UV reactivity per gram of polymeric photoinitiator. This effectively lowers the amount of polymeric photoinitiator needed to achieve a targeted level of reactivity. This is a benefit vs. telechelic polymeric photoinitiators of the prior art in which the polymer/oligomer MW dictates the level of chromophore functionality per gram of polymeric photoinitiator. The pendant architecture of the inventive materials allows for high levels of chromophore functionality to be grafted onto the polymer backbone.

The light absorbing chromophores used in the photoinitiator system disclosed herein are chosen to match as closely as possible the emission bands of the light source. Useful chromophores include compounds which undergo H-abstraction photochemistry including but not limited to benzophenone and related aromatic ketones such as xanthone, thioxanthone, 4,4'-bis(N,N'-dimethylamino)benzophenone, benzil, quinones, quinoline, anthroquinone, fluorene, acetophenone, xanthone, phenanthrene and fluorenone. A reasonably comprehensive list of useful chromophores and photophysical data for such can be found in the Polymer Handbook, Brandrup J.; Immergut, E. H.; Grulke, E. A.; Eds., John Wiley & Sons, Inc., 11/169, "Photopolymerization Reactions", Fouassier, J. P.; 1999.

Disclosed herein is an imide-linked photoinitiator selected from the group consisting of structure (I) and (II):

(I)

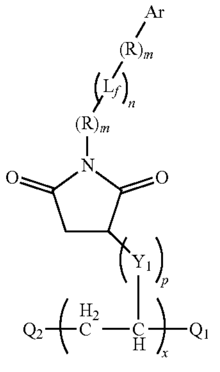

and (II)

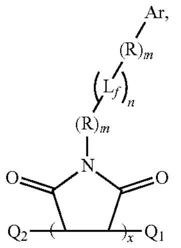

wherein $Q_1$ and $Q_2$ are each a small molecule or polymer, wherein $Q_1$ and $Q_2$ can be the same or different; Ar is selected from the group consisting of

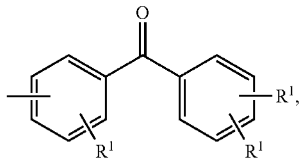

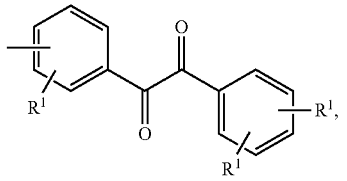

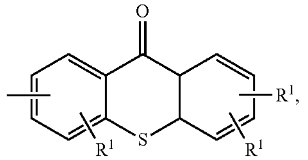

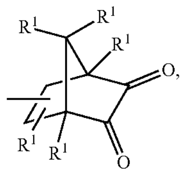

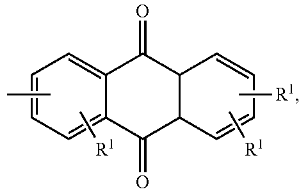

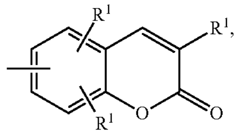

and

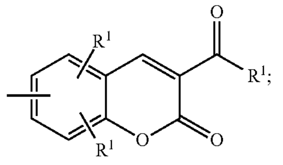

R is a linear or branched alkyl group, cycloalkyl, alkylenoxy, alkenyl or aryl group, an alkyl group containing a heteroatom or a carbonyl group; $R^1$ is independently a linear or branched alkyl group, a cycloalkyl, an alkylenoxy, an alkenyl, an aryl group, an alkyl group containing a heteroatom, a carbonyl group, H, OR, $NR_2$, SR, F, Cl, Br or I; $Y_1$ is a linear or branched ($C_1$ to $C_8$) alkylene group or a bond; $L_f$ is a functional linkage selected from the group consisting of an ether, an ester, an amide, a urethane, and a carbonate; m=0 or 1; n=0 or 1; p=0 or 1; and x=1-100.

Ar may be a benzophenone derivative. The benzophenone derivative may correspond to the following structure

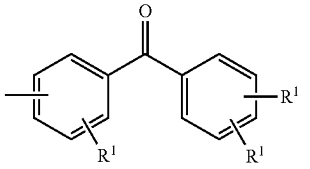

wherein $R^1$ is as defined above.

Ar may be a thioxanthone derivative. The thioxanthone derivative may correspond to the following structure

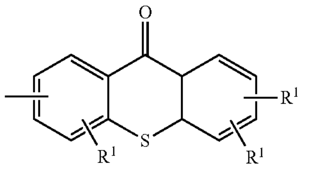

wherein $R^1$ is as defined above.

The R groups may be the same or different. In particular, each R may independently be selected from linear or branched alkylene, cycloalkylene, alkylenoxy, alkenylene, arylene and alkylene which contains a heteroatom or a carbonyl group.

In particular, the $-(R)_m(L_f)_n-(R)_m-$ moiety linking each Ar group to an imide group may be selected from a bond, or a linker having the following formula:

*-Alk-O—C(=O)-Alk-O-§

*-Alk-NH—C(=O)-Alk-O-§ wherein each Alk is independently a linear or branched alkylene, * is the point of attachment to the nitrogen atom of the imide group and § is the point of attachment to the Ar group.

In one embodiment, when p=0 for structure I, the polymeric imide-linked photoinitiator contains repeat units of the following structure III:

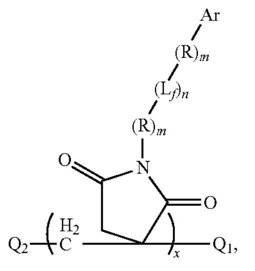

wherein $Q_1$, $Q_2$, R, $L_f$, Ar, m, and n are as defined above.

The presence of the chromophores (i.e. Ar groups) in the polymeric photoinitiators of the invention renders them sensitive to ultraviolet and/or visible irradiation and thus capable of initiating and/or participating in crosslinking upon exposure to such a source of light.

$Q_1$ and $Q_2$ may comprise repeating units derived from the polymerization of one or more ethylenically unsaturated monomers. As used herein the term "ethylenically unsaturated monomer" means a monomer that comprises a polymerizable carbon-carbon double bond. A polymerizable carbon-carbon double bond is a carbon-carbon double bond that can react with another carbon-carbon double bond in a polymerization reaction. Examples of suitable ethylenically unsaturated monomers include olefins, dienes, (meth)acrylic monomers, vinyl ethers, styrenic monomers and mixtures thereof. The olefin may be selected from ethylene, propylene, isopropylene, 1-butene, isobutylene, 1-pentene, 1-hexene, 1-heptene, 1-octene, 1-nonene, 1-decene, 1-dodecene, 1-tetradecene, 1-hexadecene, 1-octadecene, 1-eicosene, and mixtures thereof. The diene may be selected from butadiene, isoprene, chloroprene, dicyclopentadiene and mixtures thereof. The (meth)acrylic monomer may be a compound having a (meth)acryloyl group of formula $-C(=O)-CR=CH_2$, wherein R is H or methyl. In particular, the (meth)acrylic monomer may selected from (meth)acrylic acid, an alkyl ester of (meth)acrylic acid, a (meth)acrylamide and mixtures thereof. The vinyl ether may be a compound having a group of formula $-O-CH=CH_2$. In particular, the vinyl ether may be selected from methyl vinyl ether, ethyl vinyl ether, isopropyl vinyl ether, n-butyl vinyl ether, isobutyl vinyl ether, n-hexadecyl vinyl ether, 2-chloroethyl vinyl ether, benzyl vinyl ether, cyclohexyl vinyl ether and mixtures thereof. The styrenic monomer may be a monomer that contains a carbon-carbon double bond in alpha position to an aromatic ring. In particular, the styrenic monomer may be selected from styrene, alpha-methylstyrene, tert-butylstyrene, ortho-, meta-, and para-methylstyrene, ortho-, meta- and para-ethylstyrene, o-methyl-p-isopropylstyrene, p-chlorostyrene, p-bromostyrene, o,p-dichlorostyrene, o,p-dibromostyrene, ortho-, meta- and para-methoxystyrene, optionally substituted indenes, optionally substituted vinylnaphthalenes, acenaphthylene, diphenylethylene, vinyl anthracene and mixtures thereof.

$Q_1$ and $Q_2$ may further comprise one or more units of the following structure (IV) or (V):

(IV)

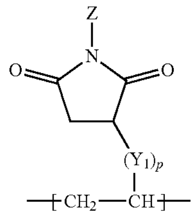

(V)

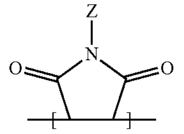

wherein $Y_1$ and p are as defined above; and Z is a moiety that does not comprise an Ar group as defined above. For example, Z may be an alkyl, a cycloalkyl or a polyether moiety. In particular, Z may be a polyether moiety, more particularly Z may be a polyoxyalkylene moiety, even more particularly Z may be a moiety comprising a plurality of oxyethylene and/or oxypropylene repeating units. For example, Z may be a poly(oxyalkylene) terminated by an alkyl group, in particular a poly(oxypropylene), poly(oxyethylene) or poly(oxypropylene-co-oxyethylene) terminated by an alkyl group.

Units of structure (IV) or (V) may be useful to increase the solubility of the photoinitiator in the composition in which it will be introduced. The Z group(s) may also provide abstractable hydrogen atoms which may act synergistically with the chromophore(s) during the photoinitiation process.

The Type II imide-linked photoinitiators of structure (I), (II) and (III) are synthesized by grafting chromophore to a polymer backbone ($Q_1$ and/or $Q_2$) via the linking moiety. Any polymer which contains anhydride functionality can be used in the practice of the invention. For example, unsaturated polymers that can be maleinized (typically via an "ene" reaction) and used in the practice of the invention include but are not limited to styrene-butadiene-styrene (SBS), styrene-isoprene-styrene (SIS), poly(butadiene) (pBD), random styrene-butadiene-styrene rubber (SBR), ethylene-propylene-dicyclopentadiene (EPDM) and acrylate polymers containing pendent or backbone unsaturation. Maleated base polymers include: acrylates, polybutadiene, polyisoprene, SIS, SBS, styrene-b-ethylene/butylene-b-styrene, styrene-b-ethylene/propylene-b-styrene, or polyisobutylene. For additional example, polymers with saturated backbones containing anhydride groups can also be used. Examples include styrene-maleic anhydride copolymers and acrylic copolymers which contain repeat units derived from maleic anhydride or itaconic anhydride.

In some embodiments, $Q_1$ and $Q_2$ are independently derived from maleinized poly(butadiene), maleinized poly (isoprene), maleinized poly(styrene-b-butadiene-b-styrene), or maleinized poly(styrene-b-isoprene-styrene), maleinized poly(styrene-b-ethylene/butylene-b-styrene), maleinized poly(styrene-b-ethylene/propylene-b-styrene), styrene-co-maleic anhydride, maleic anhydride-co-ethyl vinyl ether, maleic anhydride-co-methyl vinyl ether, maleic anhydride-co-decene, or an anhydride functional acrylic polymer.

In other embodiments, $Q_1$ and $Q_2$ are independently derived from styrene-butadiene-styrene (SBS); styrene-isoprene-styrene (SIS); poly(butadiene); random styrene-butadiene-styrene rubber (SBR); acrylate polymers containing pendant or backbone unsaturation; maleinized poly(butadiene), maleinized poly(isoprene), maleinized poly(styrene-b-butadiene-b-styrene), or maleinized poly(styrene-b-isoprene-styrene), maleinized poly(styrene-b-ethylene/butylene-b-styrene), maleinized poly(styrene-b-ethylene/propylene-b-styrene), styrene-co-maleic anhydride, maleic anhydride-co-ethyl vinyl ether, maleic anhydride-co-methyl vinyl ether, maleic anhydride-co-decene or an anhydride functional acrylic polymer.

According to certain embodiments, the above-described repeating units are arranged randomly or statistically along the backbone of the Type II imide-linked photoinitiator. However, in other embodiments, the Type II imide-linked photoinitiator may have a more ordered structure.

The Type II imide-linked photoinitiator may correspond to a structure comprising the following repeating units in any order:

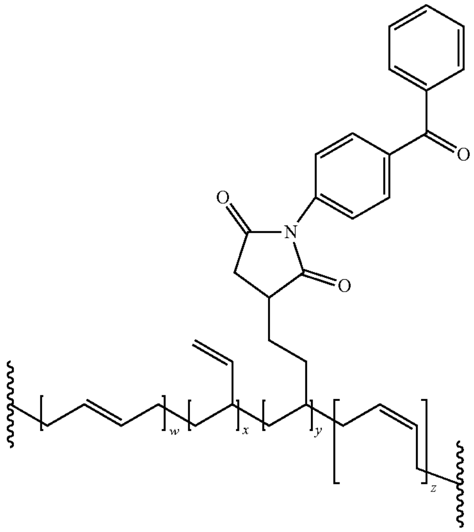

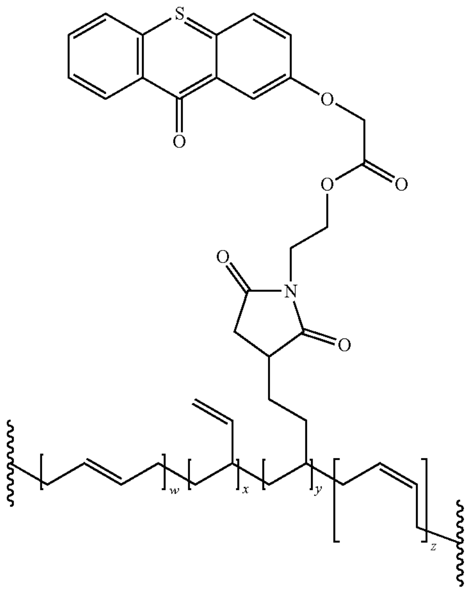

-continued

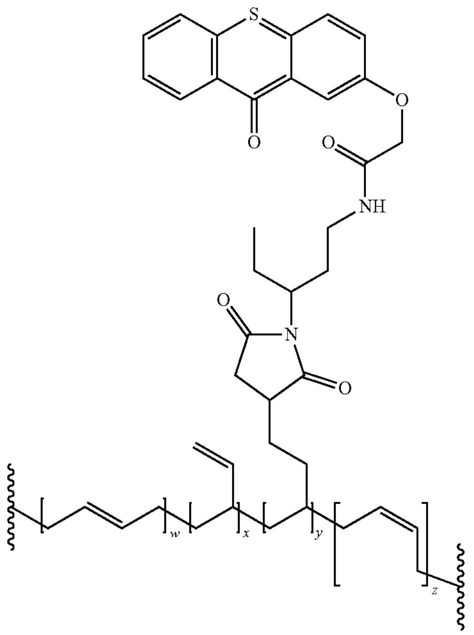

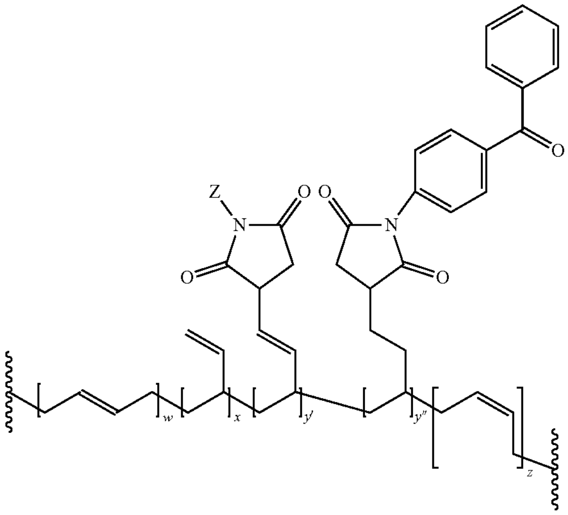

-continued

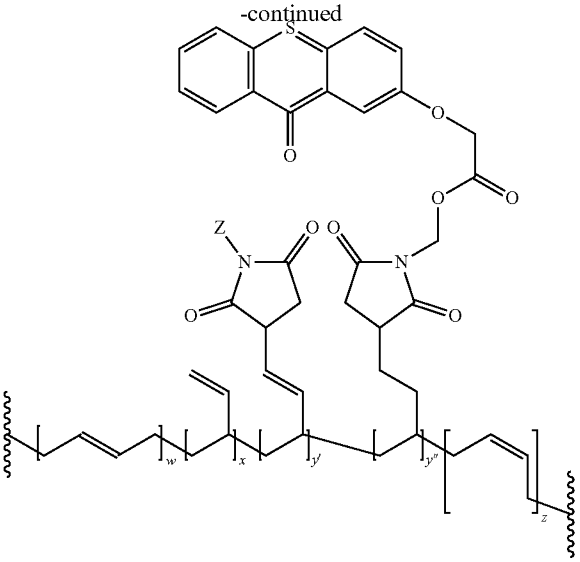

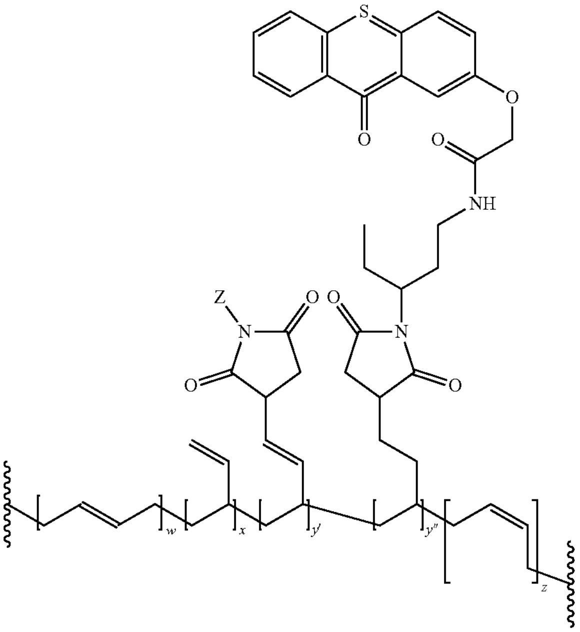

wherein w, x, y, y', y" and z are independently integers from 1 to 100; and Z is as defined above.

In particular, w, x and z may be from 2 to 80, or from 5 to 70 or from 10 to 60; y may be from 2 to 50, or from 5 to 40, or from 8 to 30; and the sum y'+y" may be from 2 to 50, or from 5 to 40, or from 8 to 30.

One synthetic route to the Type II imide-linked photoinitiators of, for example, structures (I) and (II) utilizes various anhydride-functional polymer backbones (such as styrene-co-maleic anhydride (SMA) and maleinized polybutadiene) and forms grafted photoinitiator functionality via imidization reactions of primary amino-functional chromophores. 4-Aminobenzophenone as a precursor is particularly preferred, but other amino-functional chromophores can be employed. An exemplary synthesis is shown below:

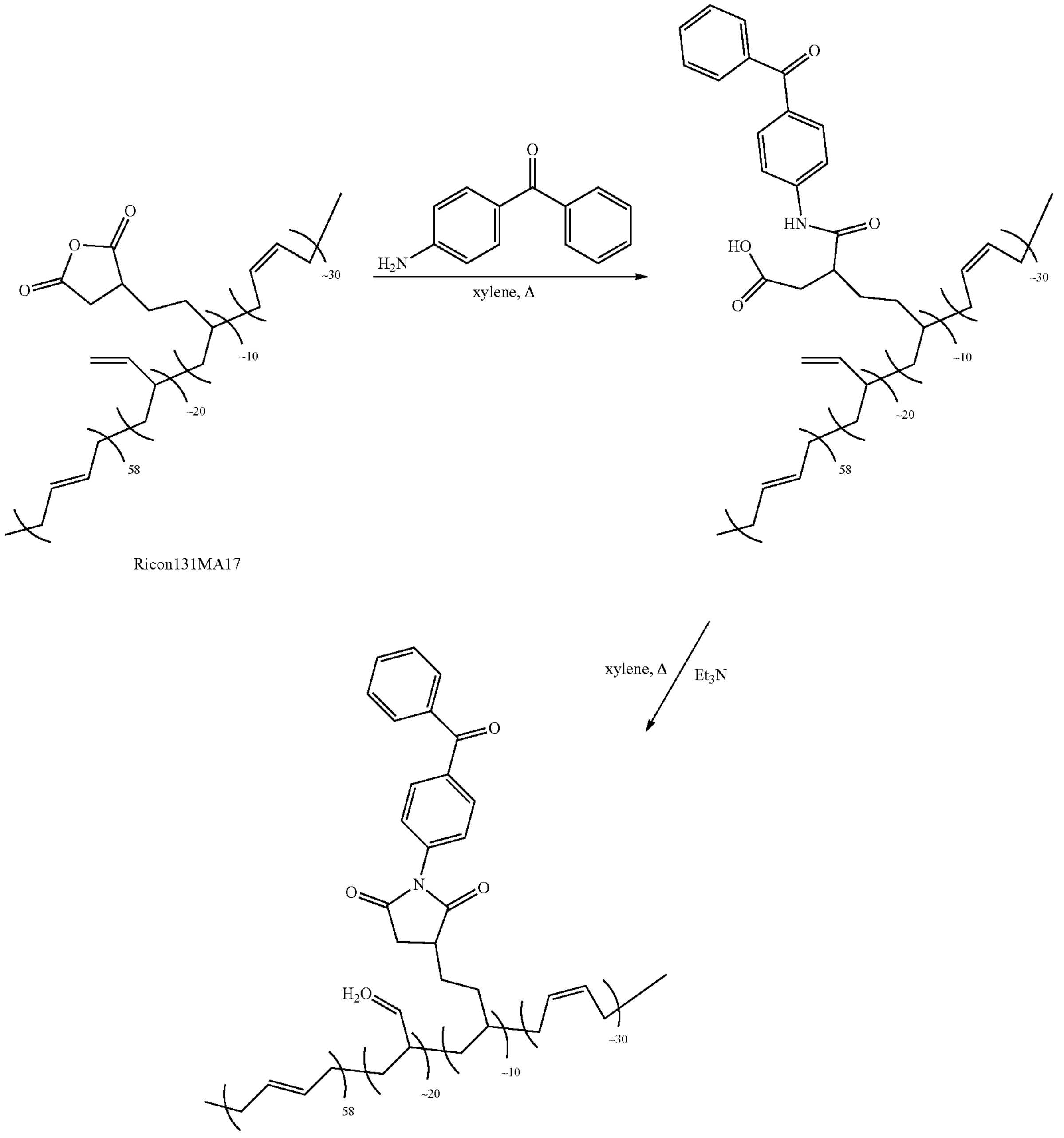

Ricon131MA17

Imide Linked Polymeric Photoinitiator 1

Another synthetic route to the Type II imide-linked photoinitiators of structure (I) and (II) utilizes various anhydride-functional polymer backbones (such as styrene-co-maleic anhydride (SMA) and maleinized polybutadiene) and forms grafted photoinitiator functionality via imidization reactions of primary amino-functional chromophores by first building the linking moiety onto the polymer/oligomer backbone prior to addition of the aromatic portion of the chromophore:

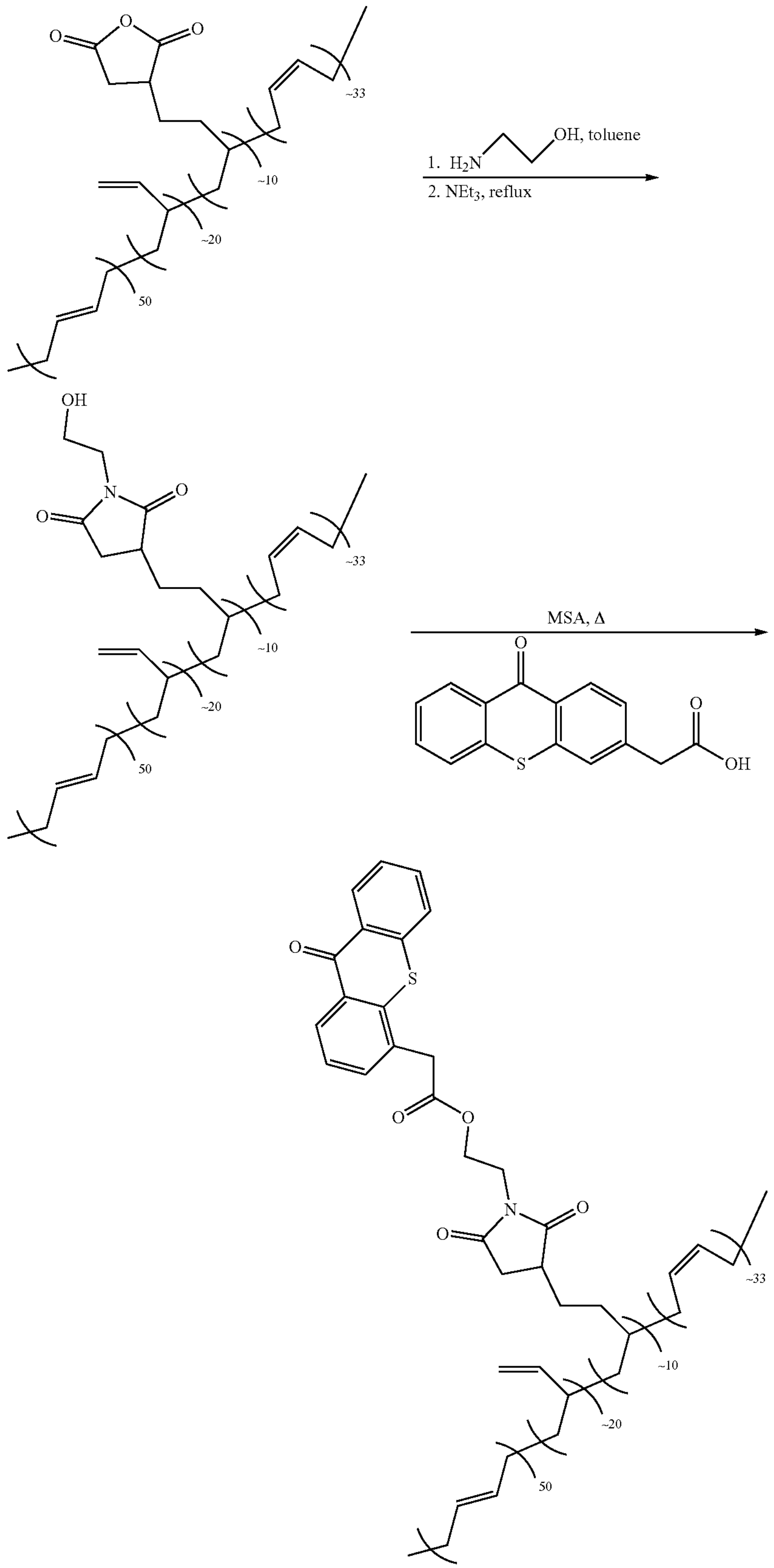
1. H2N OH, toluene
2. NEt3, reflux
MSA, Δ

The following synthesis provides another example synthetic route to the Type II imide-linked photoinitiators of structure (I) and (II) by first building the linking moiety prior to addition of the aromatic portion of the chromophore:

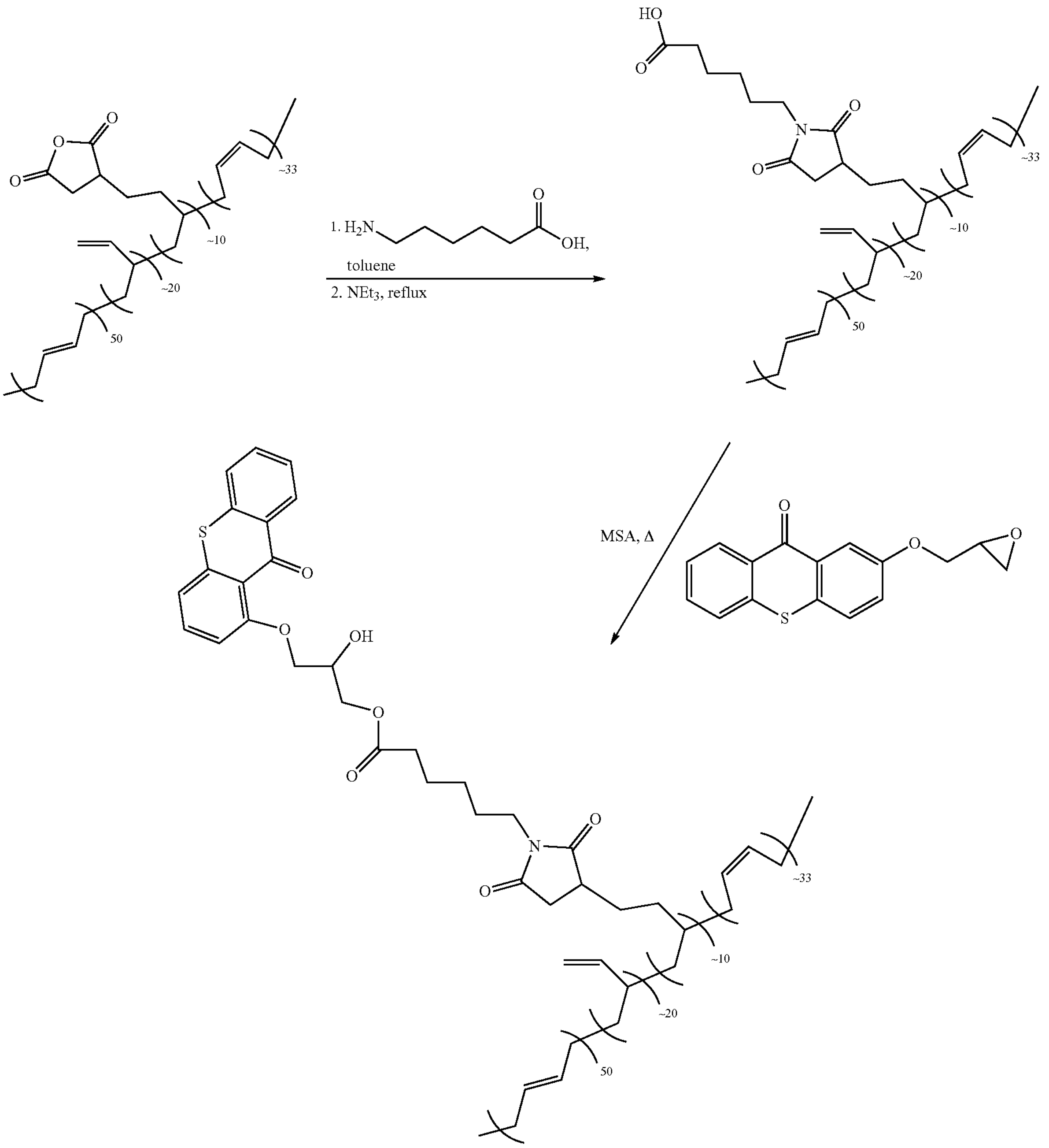

The pendent architecture allows for the synthesis of highly functional, high molecular weight polymeric photoinitiators. As previously noted, the pendant polymer architecture allows for independent control of chromophore functionality level vs. backbone MW, in contrast to telechelic analogs. Preferably, the imide-containing polymeric photoinitiators have a $M_n$ of from about 500 to about 500,000, more preferably a $M_n$ of from about 1000 to about 50,000, and most preferably a $M_n$ of from about 1000 to about 20,000. A benefit of higher molecular weights is that the polymer is less likely to migrate from the cured coating in the unlikely event it does not covalently linked to the cured network.

The polymeric imide-linked photoinitiators disclosed herein may be used to prepare a wide variety of radiation curable materials including coatings, inks, adhesives (including hot melt pressure sensitive and laminating adhesives), sealants, and encapsulants. The use of the term coating compositions is used broadly herein to mean decorative and abrasion resistant coatings, lacquers, fiber reinforced composites, microelectronic encapsulations, fiber optic coatings, molding compounds, UV-set structural resins and the like. The high MW, high reactivity, and potential for zero photo-fragments related to the photoinitiator makes the novel photoinitiators particularly useful in applications which require low odor and low extractables, such as medical adhesives, food packaging inks, and electronics adhesives or encapsulants. The applications in which one may use the inventive polymeric photoinitiators is not limited, and is known to those skilled in the art.

The polymeric imide-linked photoinitiators disclosed herein are more stable than corresponding amide-linked polymeric photoinitiators both thermally and hydrolytically. In this regard, the imide linkage minimizes the possibility of the chromophore cleaving from the backbone during use at elevated temperatures thus resulting in the formation of extractable components in the cured product containing the polymeric photoinitiator. The imide linkage also minimizes the possibility of the chromophore cleaving from the backbone during use in humid environments, as cleavage would also result in extractable components in the cured product containing the polymeric photoinitiator. The polymeric imide-linked photoinitiators disclosed herein are generally more soluble in common solvents and UV curable resin components relative to the corresponding amide-linked polymeric photoinitiator.

The imide-linked polymeric photoinitiators disclosed herein may be used to prepare a wide variety of radiation curable materials including pressure sensitive hot melt adhesives and coating compositions. The use of the term coating compositions is used broadly herein to mean decorative and abrasion resistant coatings, lacquers, fiber reinforced composites, microelectronic encapsulations, fiber optic coatings, molding compounds, UV-set structural resins and the like.

In radiation curable compositions, crosslinking occurs by exposure to actinic and/or ionizing radiation. The term "radiation" is used herein to include actinic radiation such as ultraviolet radiation and ionizing radiation created by the emission of electrons or highly accelerated nuclear particles such as neutrons, alpha-particles etc.

Relative to typical commercially available photoinitiators, the polymeric photoinitiators of the invention are thermally and hydrolytically stable before and after UV cure, exhibit reduced odor after cure in UV curable compositions, exhibit reduced extractables in UV curable compositions, and can efficiently UV cure thick films if the proper lamp/chromophore pair is utilized.

In the practice of the present development, any base resins suitable for use in formulating adhesives and coating compositions, as are well known to those skilled in the art, may be used in the practice of the invention. The resins utilized with the new photoinitiators are not limited as long as they dissolve the polymeric photoinitiator. With respect to solubility, the fully imidized nature of the inventive imide-linked polymeric photoinitiators improves their solubility in typical UV/EB curable resins relative to amide-linked materials of the prior art. Examples of liquid and solid resins which may be used include acrylate-functional monomers and oligomers available from Sartomer. For hotmelt pressure sensitive & laminating adhesives, solid/film type heat seals or film substrates, useful melt or solution processible polymers include amorphous polyolefins, ethylene-containing polymers and rubbery block copolymers, as well as blends thereof. Systems, based on acrylate, epoxide, siloxane, styryloxy, vinyl ether and other monomers, oligomers, or prepolymers such as polyimides and cyanate ester resins and/or polymers and hybrids thereof, may be used. The compositions may be selected from liquid or solid olefinically unsaturated systems, such as acrylates, methacrylates, maleimides, styrenics, maleate esters, fumarate esters, unsaturated polyester resins, alkyl resins, polyisoprene, polybutadiene and thiol-ene compositions. Polymers such polyisoprene or polybutadiene, or their random or block copolymers with styrene may be used with or without partial hydrogenation of the diolefin. To increase reactivity, such polymers with no to full hydrogenation of the diolefin can be acrylated via grafting of maleic anhydride followed by the ring opening reaction with a hydroxy acrylate. Such materials are available under the tradename RICACRYL™ from Cray Valley and from Kuraray Chemical as UC Resins. Functional oligomeric or polymeric resins based on backbone structures such as silicones, polyesters and urethanes, such as acrylate, methacrylate, maleimide or vinyl-terminated resins may also be utilized.

Radiation curable thiol-ene compositions comprise a polythiol, an olefinic or "ene" compound, and the imide-linked polymeric photoinitiator disclosed herein. The polyene component of the thiolene system may be any component containing a reactive, unsaturated group, most desirably attached to an electron-rich atom or group. Thus, a preferred polyene is a polyfunctional vinyl ether; other suitable groups include but are not limited to allylic ethers, vinyl sulfides, styrenes, acrylamides, and acetylenes. Another suitable class of compounds are materials derived from the esterification of a polyol and bicyclic enes such as norbornene carboxylate (the reaction product of cyclopentadiene and acrylate), although their ester functionality may compromise hydrolytic stability. With respect to the thiol (mercaptan) component, primary thiols containing 6 to 40 carbon atoms, such as 1,10-decane dithiol, or any linear, cyclic or branched hydrocarbon thiol containing from one to ten thiol groups may be used. Primary thiols are preferred, inasmuch as they are most reactive, followed by secondary, and, finally, the least reactive tertiary thiols. Examples of useful polythiols include but are not limited to ethylene glycol bis(thioglycolate), ethylene glycol bis(β-mercaptopropionate), trimethylolpropane tris(thioglycolate), trimethylolpropane tris(β-mercaptopropionate), pentaerythritol tetrakis(thioglycolate, pentaerythritol tetrakis(β-mercaptopropionate), all of which are commercially available. In general, one skilled in the art can apply various methods to synthesize polythiols tailored to specific application areas. A particularly useful class of polythiols are derived from the esterification of various polyols with mercapto-acids such as 3-mercatopropionic acid.

The imide-linked polymeric photoinitiators disclosed herein will typically be used in amounts of from about 0.05% by weight to about 15% by weight of the chromophore portion of the polymer based on the weight of the formulated composition, preferably in amounts ranging from about 0.1% by weight to about 12% by weight, more preferably from about 0.5% by weight to about 10% by weight. The concentration is chosen based on the thickness of the application of the uncured radiation curable composition, the desired cure speed and lamp type used. Combinations of two or more photoinitiators may also be used to achieve the best possible cure of the formulated compositions. Photoinitiators are preferably used in the least amount necessary to get initiation of cure at the line speed of the process and desired strength for the end use contemplated. This amount will be dependent on the polymeric composition, as well as the source of radiation, the amount of radiation received, the production line speed, and the thickness of the coating on the substrate. The cure process is generally more efficient in the absence of oxygen, for example, in the presence of nitrogen, so a greater amount of photoinitiator is generally required in the presence of oxygen.

Adhesives and coatings comprising the imide-linked polymeric photoinitiators disclosed herein will be formulated with conventional additives known and used by the skilled artisan. The polymer composition may also comprise various other additives chosen based upon the contemplated end use of the polymer. For example, if the end use is a pressure sensitive adhesive, additives such as plasticizers, tackifiers, and fillers, which are conventionally used in the preparation of coatings, adhesives, sealants, inks, hot melts and pressure sensitive adhesives can be added. The choice and amount of these additives are within the expertise of those skilled in the art.

Antioxidants are typically added to compositions disclosed herein to protect the ingredients against degradation during preparation and use of the compositions, however without interfering with the irradiation curing of the polymer. Combinations of antioxidants are often more effective due to the different mechanisms of degradation to which various polymers are subject. Examples of commercially available antioxidants include hydroquinone (HQ), methoxyhydroqinone (MEHQ), butylated hydroxytoluene (BHT), vitamin E, phenothiazine, IRGANOX™ 3052, IRGANOX™ 1010 (pentaerythrityl-tetrakis[3-(3,5-di-tert-butyl-4-hydroxyphenyl)propionate-); IONOL™ (2,6-di-tertiary-butyl-4-methyl phenol); IONOX™ 330 (3,4,6-tris(3,5-di-tertiary-butyl-p-hydroxybenzyl)-1,3,5-trimethylbenzene-); and POLYGARD™ HR (tris-(2,4-di-tertiary-butyl-phenyl) phosphite). To ensure long-term thermal stability, in general from about 0.1% to about 3% by weight of one or more antioxidants is included in the adhesive compositions, preferably from about 0.4% by weight to about 1.5% by weight.

In addition to the above-described additional materials, the various compositions disclosed herein may include other additives known to those skilled in the art. These additives may include, but are not limited to, pigments, fillers, fluorescent additives, flow and leveling additives, wetting agents, surfactants, antifoaming agents, rheology modifiers, stabilizers, photosensitizers and antioxidants. Preferred additives are those which do not have appreciable absorption in the wavelengths of interest.

Examples of pigments and filler materials include, but are not limited to, titanium dioxide, carbon black, carbon nanotubes, graphene, boron nitride, alumina, hydrophobic amorphous fumed silica, amorphous precipitated silica, and polymer powders. Examples of flow and leveling additives, wetting agents, and antifoaming agents include silicones, hydrocarbons, fluorine-containing compounds, and non-silicone polymers and copolymers such as co-polyacrylates.

The compositions disclosed herein are prepared by conventional methods. For liquid formulations this typically simply requires low shear mixing of all liquid and solid components. For melt-processed materials, processing conditions familiar to those skilled in the art may be used. As an example, the block copolymers, the tackifying resin and other desired components may be blended at an elevated temperature, (e.g. temperature of about 300° F.) using an extruder, a Z-blade mixer or other conventional mixing device. The thermal stability of Type II initiators is superior to Type I fragmenting system, and as such Type II initiators such of those presented herein are preferred for hot melt processing and applications.

The polymer composition disclosed herein can be used in most applications where an adhesive or coating composition is applied to a backing or substrate. The substrate can be in the form of end products or devices, films, tapes, sheets, panels, and the like, and can be made of materials, such as, glass, paper, fabric, plastic, nonwoven fiber (e.g., disposable absorbent garments), metal, foil, natural rubber, synthetic rubber, wood and wood composites.

Application of the compositions disclosed herein to a substrate may be accomplished using any conventional means, such as, roll coating, syringe or cartridge based dispensing, slot orifice coating, spray or extrusion coating. If a coated substrate is to be used in the form of a roll, the back of the substrate may be coated with a release back size to prevent the composition from adhering to that side of the substrate. If a substrate is to be coated on both sides and rolled, a release paper or other protective means may be laid on one layer of the composition to prevent that layer from adhering to the composition on the other side of the substrate. In some uses, a second substrate may be applied directly to the composition.

After the polymer composition is applied to the substrate, it is crosslinked by ultraviolet (UV) or electron beam (EB) radiation in air or nitrogen atmospheres. The crosslinking may be done immediately, during or after application of the polymer The composition containing the photoinitiator is exposed to ultraviolet radiation having a wavelength within the range of 180 to 450 nm, preferably 200 to 390 nm, for a period of time sufficient to accomplish the desired amount of crosslinking. The exact length of exposure will be dependent upon the nature and intensity of the radiation, the particular ultraviolet photoinitiator and amount used, the polymer system, the thickness of the film, environmental factors, and the distance between the radiation source and the adhesive film. The determination of these parameters is within the expertise of one skilled in the art. The actual radiation used can be actinic light from any source, provided it furnishes an effective amount of ultraviolet radiation, since the compositions of the invention activatable by actinic light will generally exhibit their maximum sensitivity to wavelengths in the ultraviolet range. Irradiation may be carried out at any temperature, and most suitably is carried out at room temperature for economic reasons. The distance between the radiation source and adhesive on the coated substrate may range from about 0.32 cm to 25.4 cm (⅛ to 10 inches), and preferably is from 0.32 cm to 17.8 cm (⅛ to 7 inches). Common light sources include medium pressure mercury lamps, xenon flash lamps, and light emitting diodes. The materials may also be cured using electron beam energy sources as well.

Aspects of the Invention

Aspect 1. An imide-linked photoinitiator selected from the group consisting of structure (I) and (II):

(I)

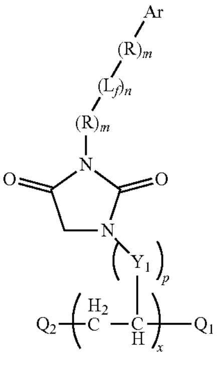

and

-continued (II)

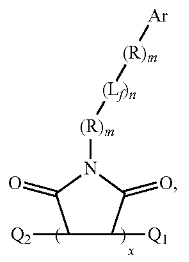

wherein $Q_1$ and $Q_2$ are each a small molecule or polymer, wherein $Q_1$ and $Q_2$ can be the same or different;

Ar is selected from the group consisting of

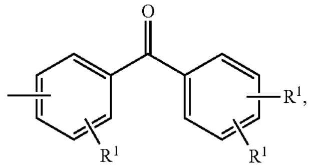

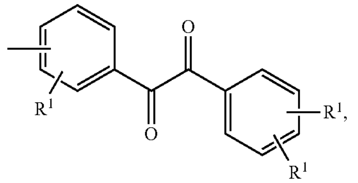

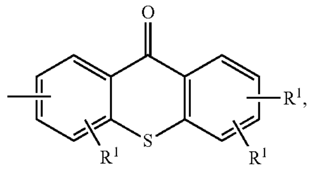

,

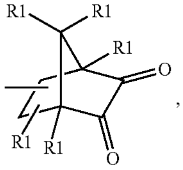

,

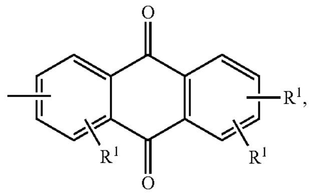

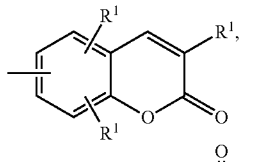

and

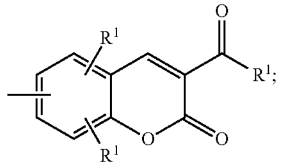

R is a linear or branched alkyl group, cycloalkyl, alkylenoxy, alkenyl or aryl group, an alkyl group containing a heteroatom or a carbonyl group;

$R^1$ is independently a linear or branched alkyl group, a cycloalkyl, an alkylenoxy, an alkenyl, an aryl group, an alkyl group containing a heteroatom, a carbonyl group, H, OR, $NR_2$, SR, F, Cl, Br or I;

$Y_1$ is a linear or branched ($C_1$ to $C_8$) alkylene group or a bond;

$L_f$ is a functional linkage selected from the group consisting of an ether, an ester, a urethane, and a carbonate; m=0 or 1; n=0 or 1; p=0 or 1; and x=1-100.

Aspect 2. The imide-linked photoinitiator of aspect 1 wherein $Q_1$ and $Q_2$ are each derived from maleinized poly (butadiene), maleinized poly(isoprene), maleinized poly (styrene-b-butadiene-b-styrene), or maleinized poly(styrene-b-isoprene-styrene), maleinized poly(styrene-b-ethylene/butylene-b-styrene), maleinized poly(styrene-b-ethylene/propylene-b-styrene), styrene-co-maleic anhydride, maleic anhydride-co-ethyl vinyl ether, maleic anhydride-co-methyl vinyl ether, maleic anhydride-co-decene, or an anhydride functional acrylic polymer.

Aspect 3. The imide-linked photoinitiator of aspect 1 or 2 wherein $Q_1$ and $Q_2$ are the same.

Aspect 4. The imide-linked photoinitiator of aspect 1 wherein $Q_1$ and $Q_2$ are maleinized poly(butadiene).

Aspect 5. The imide-linked photoinitiator of any of aspects 1~4 wherein p is 1.

Aspect 6. The imide-linked photoinitiator of any of aspects 1-5 wherein m is 1.

Aspect 7. The imide-linked photoinitiator of any of aspects 1-5 wherein m is 0.

Aspect 8. The imide-linked photoinitiator of claim 1 wherein $Q_1$ and $Q_2$ are each derived from styrene-butadiene-styrene (SBS); styrene-isoprene-styrene (SIS); poly(butadiene); random styrene-butadiene-styrene rubber (SBR); acrylate polymers containing pendant or backbone unsaturation; maleinized poly(butadiene), maleinized poly(isoprene), maleinized poly(styrene-b-butadiene-b-styrene), or maleinized poly(styrene-b-isoprene-styrene), maleinized poly(styrene-b-ethylene/butylene-b-styrene), maleinized poly(styrene-b-ethylene/propylene-b-styrene), styrene-co-maleic anhydride, maleic anhydride-co-ethyl vinyl ether, maleic anhydride-co-methyl vinyl ether, maleic anhydride-co-decene or an anhydride functional acrylic polymer.

Aspect 9. The imide-linked photoinitiator of any of aspects 1, 3, or 5, wherein m is 0; Y is an ethylene group; Q is derived from maleinized poly(butadiene), maleinized poly (isoprene), maleinized poly(styrene-b-ethylene/butylene-b-styrene), and maleinized poly(styrene-b-ethylene/propylene-b-styrene); and Ar is

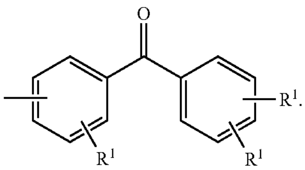

Aspect 10. The imide-linked photoinitiator of any of aspects 1-5 or 7-9 wherein m is 0; and $R^1$ is H.

Aspect 11. The imide-linked photoinitiator of aspect 1 selected from the group consisting of

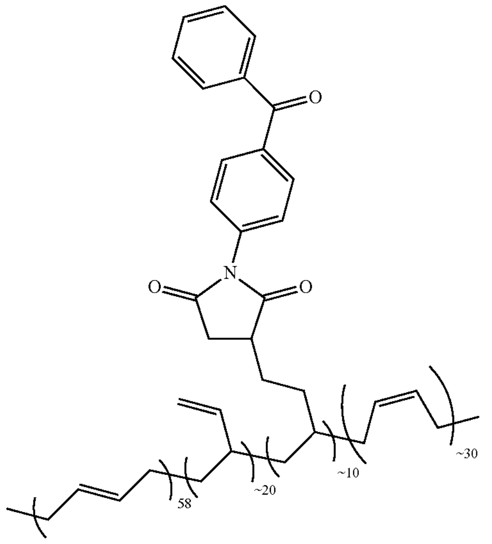

and

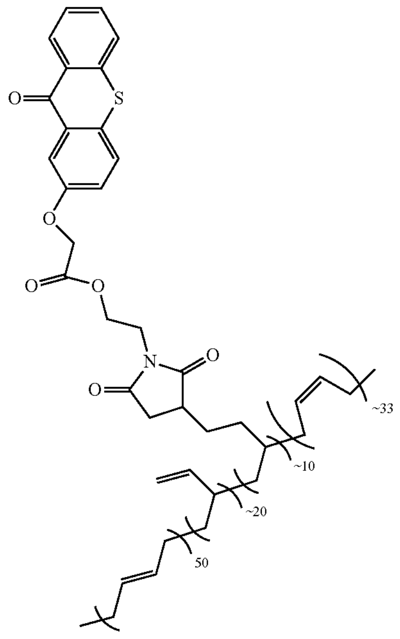

Aspect 12. The imide-linked photoinitiator of any of aspects 1-8 or 10 wherein Ar is a benzophenone derivative.

Aspect 13. A photocurable composition comprising the imide-linked photoinitiator of any of aspects 1-12.

Aspect 14. The imide-linked photoinitiator of any of any of aspects 1-12 wherein p is 0, wherein the polymeric imide-linked photoinitiator contains repeat units of the following structure III:

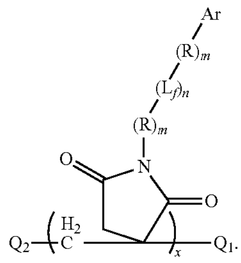

Aspect 15. The composition of aspect 13 wherein p is 0, wherein the polymeric imide-linked photoinitiator contains repeat units of the following structure III:

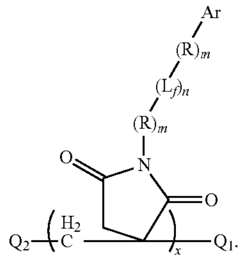

The compositions and processes disclosed herein will be illustrated in more detail with reference to the following Examples, but it should be understood that it is not deemed to be limited thereto.

EXAMPLES

Example 1. Synthesis of Imide-linked Benzophenone-functional Polymeric Photoinitiator 1

The apparatus used for the synthesis was a 500 ml round bottom flask equipped with a bushing and stirrer shaft/blade inserted into the center joint, a 20 ml Dean-Stark trap with a condenser inserted into one side joint, a thermocouple inserted into a second side joint and a nitrogen sparge inserted into a third side joint. The stirrer shaft is attached to a stirrer motor. A heating mantle was placed under the flask and was controlled with a temperature controller. Add to the flask 59.3 grams of Ricon 131MA17 (polybutadiene maleanate), 16.525 grams of 4-aminobenzophenone, 75.91 grams of p-xylene, and 16.96 grams of triethylamine. The Dean-Stark trap was filled with p-xylene, and the reaction was stirred and heated to a slow reflux rate (~128° C.). The reaction was held at reflux for 8 hours as water was collected in the Dean-Stark trap. The reaction was cooled to 120° C., and the Dean-Stark trap was replaced with a 100 ml receiver flask. The trimethylamine and p-xylene were removed from the reaction product vacuum distillation at 120° C. at a pressure of <50 mmHg. Yield was 74.0 grams of a brown semi-rubber solid. Residual 4-aminobenzophenone was 0.14%, which corresponds to 99.4% conversion and 21.4 wt % aminobenzophenone imide incorporated into the polymeric PI. UV absorbance maximum was at 258 nm. Viscosity was 241,000 cP at 60° C. Molecular weight was 9875 $M_n$ based on polystyrene standards.

Example 2. SMA-based Imide-linked Polymeric Photoinitiator

The apparatus used for the synthesis was a 500 ml round bottom flask equipped with a bushing and stirrer shaft/blade inserted into the center joint, a 20 ml Dean-Stark trap with a condenser inserted into one side joint, a thermocouple inserted into a second side joint and a nitrogen sparge inserted into a third side joint. The stirrer shaft was attached to a stirrer motor. A heating mantle was placed under the flask and was controlled with a temperature controller. To the flask was added 30.00 grams of PolyScope XIRAN 1000P (styrene maleic anhydride copolymer), 17.84 grams of 4-aminobenzophenone and 130 grams of butyl acetate. The Dean-Stark trap was filled with butyl acetate, and the reaction was agitated and heated to a slow reflux (~127° C.). The reaction was held at reflux for 80 minutes, and then cooled to 80° C., after which 18.31 grams of trimethylamine was added to the reactor. The reaction was heated to slow reflux for 8 hours. The reaction turned bright orange with some solids present. It was cooled, and then poured into a tray and dried in a vacuum oven at 125° C./40 mmHg yielding 43.5 grams of an orange solid. Residual 4-aminobenzophenone was 2.86%, which corresponded to 92.4% conversion and 34.5 wt % aminobenzophenone imide incorporated into the polymeric PI. UV absorbance maximum was at 250 nm. Molecular weight was 1997 $M_n$ based on polystyrene standards.

Example 3. Synthesis Thioxanthone-functional pBD Polymeric Photoinitiator 2 (Prophetic)

Ethanolamine (2.7 g, 44 mmol) is dissolved in toluene (20 mL) in a 100 mL round bottom flask equipped with a mechanical stirrer, addition funnel, and an internal temperature probe. The solution is cooled to 0° C. on an ice bath with stirring. To the addition funnel is charged a solution of Ricon 131MA17 (28.0 g, ~44 mmol anhydride) in toluene (50 mL). The toluene solution of maleinized rubber is slowly added to the reaction flask with stirring, keeping the internal temperature below 5° C. The reaction is stirred for 2h on ice once the slow add is complete, and then allowed to warm to room temperature to produce a product with FT-IR bands consistent with the formation of the amic acid adduct.

A Dean-Stark trap and reflux condenser is added to the flask, and excess triethylamine (88 mmol) can be added to the reactor. The reaction is brought to reflux and held at reflux for seven hours. Water formed by amic acid ring closure to imide is collected in the Dean-Stark trap. The water is removed from the trap and ca. 30 mL of toluene is distilled from the reactor to remove and residual trimethylamine as its toluene azeotrope.

Carboxymethylthioxanthone (CMTX, 7.2 g, 44 mmol) is added to the reactor along with an addition charge of toluene (50 mL). Concentrated sulfuric acid (2 mL) is added to the reaction as an acid catalyst. The reaction is then brought to reflux and water is collected in the Dean-Stark trap over the course of five hours as the esterification of the CMTX onto the alcohol-functional backbone proceeds. The reaction is allowed to cool to room temperature. The toluene solution of product is washed with a 10% $KOH_{aq}$ solution (100 mL) and then twice with distilled water (2×100 mL). The isolated organic layer is dried of $MgSO_4$, and the solvent is removed in vacuo to produce the thioxanthone based imide-linked polymeric photoinitiator 2.

Example 4. Photo-Differential Scanning Calorimetry Studies Using Polymeric Photoinitiator 1

The photoreactivity and cure kinetics of developmental polymeric photoinitiator (1) was evaluated using photo-differential scanning calorimetry (photoDSC) and compared to common benchmarks such as diphenyl(2,4,6-trimethylbenzoyl)phosphine oxide (TPO, Type I photoinitiator) and camphorquinone/2-ethylhexyl-4-(dimethylamino)benzoate (CQ/EHAB, Type II photoinitiator). Each photoinitiator was dissolved in SR355 (ditrimethylolpropane tetracrylate) to obtain ca. 3 wt. % active chromophore in the formulation. The polymer-bound photoinitiator showed good solubility in the SR355, and dissolved via dissolution on a sample roller overnight.

For each formulation, a sample of mass within the range of 5-10 mg was placed in a TA Instruments DSC 80 equipped with photoDSC adapter and Exfo spot curing unit housing a medium pressure Hg bulb. The sample was analyzed in a flat bottom aluminum DSC pan. Lamp output was filtered by a liquid silica light guide attached to the photoDSC sample cell. The UVA (310-390 nm) intensity at the sample surface was on the order of 50 $mW/cm^2$ approximated by measurements made using an EIT Power Puck II radiometer. Samples were irradiated for a total of ca. 3 minutes. Photoactivity was quantified by calculating the time from polymerization onset (lamp on) to the time of peak exotherm rate. Extent of cure for each systems was measured by integrating the area under the entire exotherm curve (from near polymerization onset to completed polymerization as defined by zero polymerization enthalpy). It is notable that this is an approximate exotherm value in these cases, as the exact placement of the initial integration time point has a significant impact on the calculated exotherm area. As can be seen in FIGS. 1-3, the goal is to approximate the area under the curve by integration using a flat baseline derived from the point selected as zero exotherm (completed polymerization) on the right time side of the integral. Given the rapid kinetics and steep slope of the initial exotherm curve for these systems, this integration method by definition approximates the heat released during the early stage of the photopolymerization. It is also noted that the exotherm is theoretically expected to become slightly higher as one moves from Experiment 3 to Experiment 2 to Experiment 1 due to the increasing content of SR355, and thus moles of acrylate per gram, in the formulation.

The photoDSC performance data shows that the inventive polymeric photoinitiator (1) exhibits similar reactivity to industry-leading photoinitiators such as the Type I TPO and the CQ/EHAB Type II system as determined by the onset to peak time ($t_{o-p}$) value. Referring to Table 1, the approximate enthalpy of polymerization ($\Delta H_p$) is similar for the three systems, indicating each can initiate extensive photopolymerization conversion. It is also notable that although polymeric photoinitiator (1) is a Type II initiating system, the inventive material does not require an added hydrogen donor (such as amine synergist EHAB) to function effectively.

TABLE 1

| Formulations and PhotoDSC Results | | | | | |
|---|---|---|---|---|---|
| Expt # | Parts Initiator* | Parts SR355 | Parts EHAB synergist | Time of polymerization onset-to-peak ($t_{o-p}$, minutes) | Approximate Enthalpy of Photopolymerization (ΔHp, J/g) |
| 1 | 3 parts TPO | 97 | — | 0.02 | 403 |
| 2 | 3 parts CQ | 95 | 2 | 0.02 | 383 |
| 3 | 8 parts polymeric PI (1) | 92 | — | 0.03 | 307 |

*to achieve 3 wt. % active chromophore in all cases

Example 5. Synthesis of Imide-linked Benzophenone-functional Polymeric Photoinitiator The apparatus used for synthesis was a 250 ml three neck round bottom flask equipped with a bushing and stirrer shaft/blade inserted into the center joint, a 20 ml Dean stark trap with condenser inserted into one side joint, and a thermocouple and nitrogen sparge inserted into the other side joint. The stir shaft was attached to an overhead stir motor. A heating mantle was placed under the flask and controlled with a temperature controller. Add to the flask 25.9 grams of Ricon 131MA17, 7.1 grams of 4-aminobenzophenone, and 112.5 grams of toluene. While at room temperature 4.5 grams of Jeffamine M-2005 was added over 5 minutes. After all the Jeffamine was incorporated 9.1 grams of triethylamine was added to the flask. The Dean-Stark trap was filled with toluene, and the reaction was stirred and heated to a slow reflux rate (~110° C.). The reaction was held at reflux for 4.5 hours and tracked through FT-IR through the conversion of the anhydride C═O at 1780 $cm^{-1}$ to the imide C═O at 1716 $cm^{-1}$. Once all anhydrides fully converted the reaction was cooled. The remaining solvent and triethylamine were removed using a rotovap.

Example 6. Synthesis of Imide-linked Thioxanthone-functional Polymeric Photoinitiator Step 1. Synthesis of Thioxanthone Functional Acid Chloride The apparatus used for synthesis was a 250 ml amber three necked round bottom flask equipped with magnetic stir bar, thermocouple and temperature controller with nitrogen sparge inserted into one side joint, condenser inserted into center joint, and Suba-seal septum inserted into the other side joint. The magnetic stir bar controlled using magnetic stir plate. A heating mantle was placed under flask and controlled using temperature controller. For a 25% solids reaction, Speedcure CMTX (15.015 g, 52.5 mmol) and dried tetrahydrofuran (75 g) were added to the flask. With a gas tight syringe, oxalyl chloride (9.985 g, 79.3 mmol) was added dropwise to the flask through the septum. After all oxalyl chloride has been added, 1-2 drops of dimethylformamide were added to the flask. Once bubbling had ceased. The material was warmed to 40C. The reaction was tracked using FT-IR. As the reaction progressed the C═O bands shifted from the raw material (~1736 $cm^{-1}$) to the desired acid chloride (~1791 $cm^{-1}$). The reaction was cooled after the C═O band at 1736 $cm^{-1}$ was gone. The remaining solvent was removed using a rotovap and the product was stored under dry nitrogen prior to subsequent use.

Step 2. Synthesis of Thioxanthone Functional Amide

The apparatus used for synthesis was a 250 ml amber three necked round bottom flask equipped with magnetic stir bar, thermocouple and temperature controller with nitrogen sparge inserted into one side joint, condenser inserted into center joint, and Suba-seal septum inserted into the other side joint. The magnetic stir bar was controlled using magnetic stir plate. To the reaction flask was added the thioxanthone-functional acid chloride from Step 1 (9.361 g, 30.8 mmol) and dried tetrahydrofuran (37.5 g) were added. Then 3.139 grams of Dytek EP diamine (3.139 g, 30.8 mmol) was then added dropwise to the reaction flask. The reaction was tracked using FT-IR through the shift of the C═O acid chloride peak at ~1791 $cm^{-1}$ to the resulting C═O amide peak ~1776 $cm^{-1}$. Once all acid chloride was consumed the reaction was stopped and rotovapped to produce a product with expected FT-IR properties.

Step 3. Synthesis of Hydrophobic Imide-linked Thioxanthone-functional Polymeric Photoinitiator The apparatus used for synthesis was a 250 ml amber three-necked round bottom flask equipped with magnetic stir bar, thermocouple and temperature controller with nitrogen sparge inserted into one side joint, condenser inserted into center joint, and Suba-seal septum inserted into the other side joint. The magnetic stir bar was controlled using magnetic stir plate. A heating mantle was placed under flask and controlled using temperature controller. The thioxanthone-functional amide of Step 2 (2.069 g, 5.6 mmol) and toluene (20 g) were added to the flask. In a separate beaker, Ricon131MA17 (2.931 g, ca. 5 mmol anhydride) and toluene (25 g) were combined. The Ricon131MA17 was heated slightly to get material into solution with the toluene. After going into solution the Ricon131MA17 was cooled to room temperature. The resulting Ricon131MA17 solution was added dropwise to the flask of amine solution. After all Ricon131MA17 solution was added, triethylamine (2.57 g) was added and the flask was heated to reflux (~110° C.). The reaction was tracked using FT-IR through the shift in the thioxanthone amide peak from −1776 $cm^{-1}$ to the resulting imide peak ~1700 cm" with a small secondary peak ~1750 $cm^{-1}$. Once all thioxanthone amide peak had disappeared and there was no change to the thioxanthione imide peak the reaction was cooled. The remaining solvent was rotovapped.

Many modifications and variations of this invention can be made without departing from its spirit and scope, as will be apparent to those skilled in the art. The specific embodiments described herein are offered by way of example only, and the invention is to be limited only by the terms of the appended claims, along with the full scope of equivalents to which such claims are entitled.

The invention claimed is:

1. An imide-linked photoinitiator selected from the group consisting of structure (I), (II), and (III):

(I)

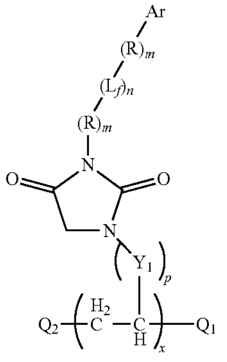

(II)

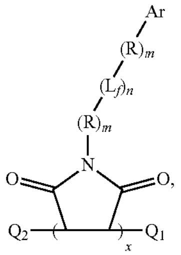

and (III)

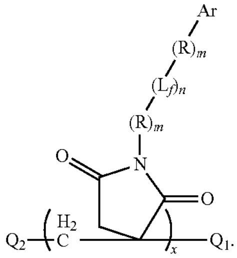

wherein $Q_1$ and $Q_2$ are each a small molecule or polymer, wherein $Q_1$ and $Q_2$ can be the same or different and comprise one or more units of the following structure (IV) or (V):

(IV)

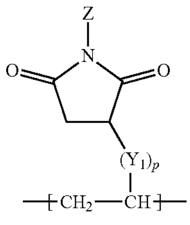

(V)

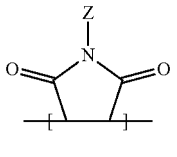

wherein Z is a moiety that does not comprise an Ar group;

Ar is selected from the group consisting of

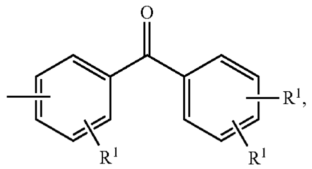

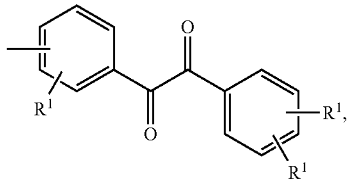

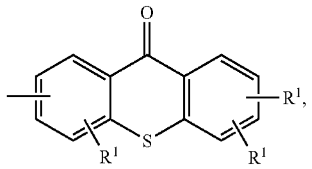

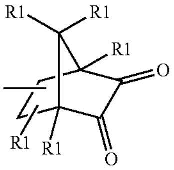

,

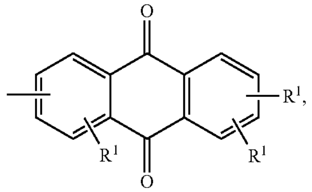

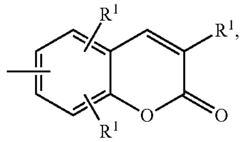

and

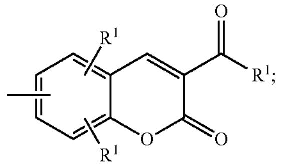

R is a linear or branched alkyl group, cycloalkyl, alkylenoxy, alkenyl or aryl group, an alkyl group containing a heteroatom or a carbonyl group;

$R^1$ is independently a linear or branched alkyl group, a cycloalkyl, an alkylenoxy, an alkenyl, an aryl group, an alkyl group containing a heteroatom, a carbonyl group, H, OR, $NR_2$, SR, F, Cl, Br or I;

$Y_1$ is a linear or branched ($C_1$ to $C_8$) alkylene group or a bond;

$L_f$ is a functional linkage selected from the group consisting of an ether, an ester, an amide, a urethane, and a carbonate;

m=0 or 1; n=0 or 1; p=0 or 1; and x=1-100.

2. The imide-linked photoinitiator of claim 1, wherein each R is independently selected from linear or branched alkylene, cycloalkylene, alkylenoxy, alkenylene, arylene and alkylene which contains a heteroatom or a carbonyl group.

3. The imide-linked photoinitiator of claim 1, wherein $Q_1$ and $Q_2$ comprise units derived from the polymerization of one or more ethylenically unsaturated monomers selected from olefins, dienes, (meth)acrylic monomers, vinyl ethers, styrenic monomers and mixtures thereof.

4. The imide-linked photoinitiator of claim 1, wherein $Q_1$ and $Q_2$ are independently derived from styrene-butadienestyrene (SBS); styrene-isoprene-styrene(SIS); poly(butadiene); random styrene-butadiene-styrene rubber (SBR); acrylate polymers containing pendant or backbone unsaturation; maleinized poly(butadiene), maleinized poly(isoprene), maleinized poly(styrene-b-butadiene-b-styrene), or maleinized poly(styrene-b-isoprene-styrene), maleinized poly(styrene-b-ethylene/butylene-b-styrene), maleinized poly(styrene-b-ethylene/propylene-b-styrene), styrene-co-maleic anhydride, maleic anhydride-co-ethyl vinyl ether, maleic anhydride-co-methyl vinyl ether, maleic anhydride-co-decene or an anhydride functional acrylic polymer.

5. The imide-linked photoinitiator of claim 1, wherein Z is an alkyl, a cycloalkyl or a polyether moiety.

6. The imide-linked photoinitiator of claim 5, wherein $Q_1$ and $Q_2$ are independently derived from maleinized poly (butadiene), maleinized poly(isoprene), maleinized poly (styrene-b-butadiene-b-styrene), or maleinized poly(styrene-b-isoprene-styrene), maleinized poly(styrene-b-ethylene/butylene-b-styrene), maleinized poly(styrene-b-ethylene/propylene-b-styrene), styrene-co-maleic anhydride, maleic anhydride-co-ethyl vinyl ether, maleic anhydride-co-methyl vinyl ether, maleic anhydride-co-decene, or an anhydride functional acrylic polymer.

7. The imide-linked photoinitiator of claim 1, wherein $Q_1$ and $Q_2$ are the same.

8. The imide-linked photoinitiator of claim 1, wherein $Q_1$ and $Q_2$ are maleinized poly(butadiene).

9. The imide-linked photoinitiator of claim 1, wherein Ar is a benzophenone derivative.

10. The imide-linked photoinitiator of claim 1, wherein Ar is a thioxanthone derivative.

11. The imide-linked photoinitiator of claim 1, wherein p is 1.

12. The imide-linked photoinitiator of claim 1, wherein m is 1.

13. The imide-linked photoinitiator of claim 1, wherein m is 0.

14. The imide-linked photoinitiator of claim 1, wherein m is 0; Y is an ethylene group; $Q_1$ and Q2 are derived from maleinized poly(butadiene), maleinized poly(isoprene), maleinized poly(styrene-b-ethylene/butylene-b-styrene), and maleinized poly(styrene-b-ethylene/propylene-b-styrene); and Ar is

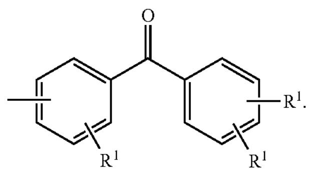

15. The imide-linked photoinitiator of claim 14, wherein $R^1$ is H.

16. The imide-linked photoinitiator of claim 1, wherein m and n are 1; Y is an ethylene group; $Q_1$ and $Q_2$ are derived from maleinized poly(butadiene), maleinized poly(isoprene), maleinized poly(styrene-b-ethylene/butylene-b-styrene), and maleinized poly(styrene-b-ethylene/propylene-b-styrene); Ar is

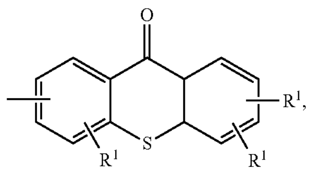

and optionally, $R^1$ is H.

17. The imide-linked photoinitiator of claim 16, wherein $R^1$ is H.

18. The imide-linked photoinitiator of claim 1, which corresponds to a structure comprising the following repeating units in any order

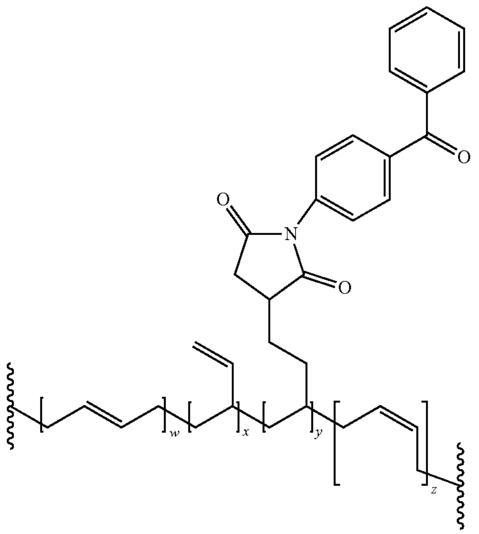

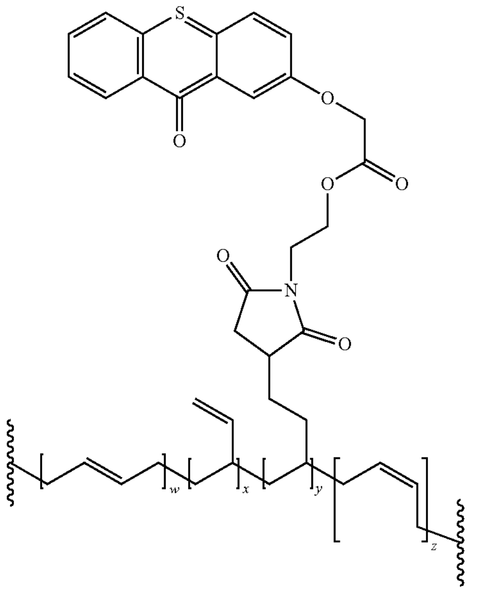

-continued
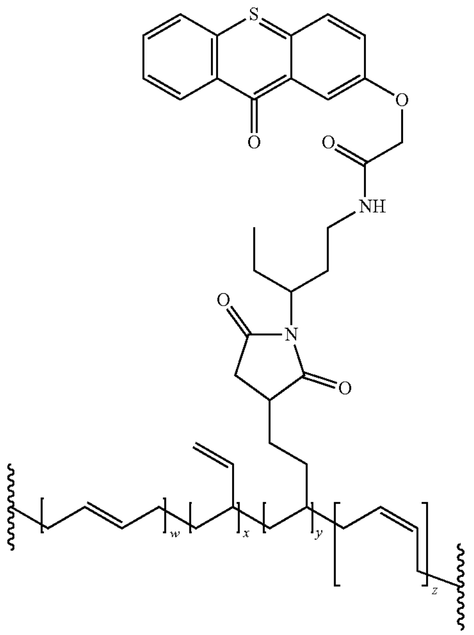
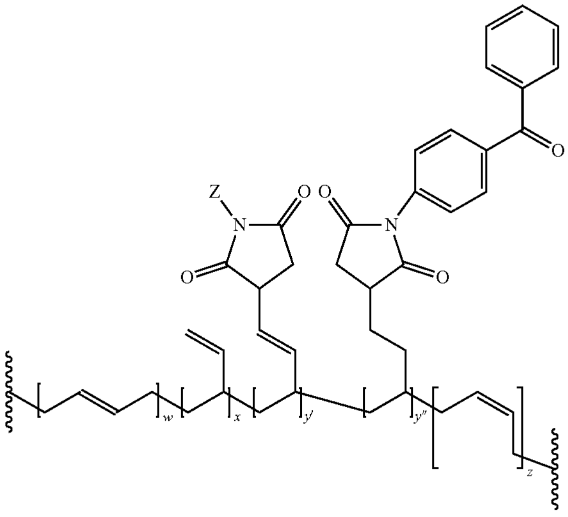
-continued
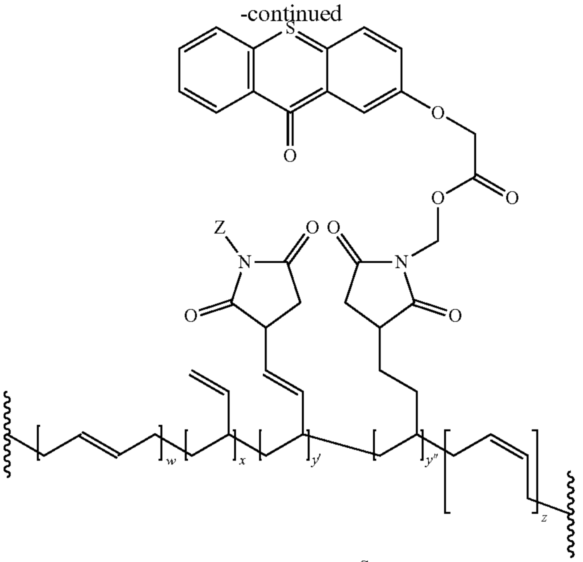
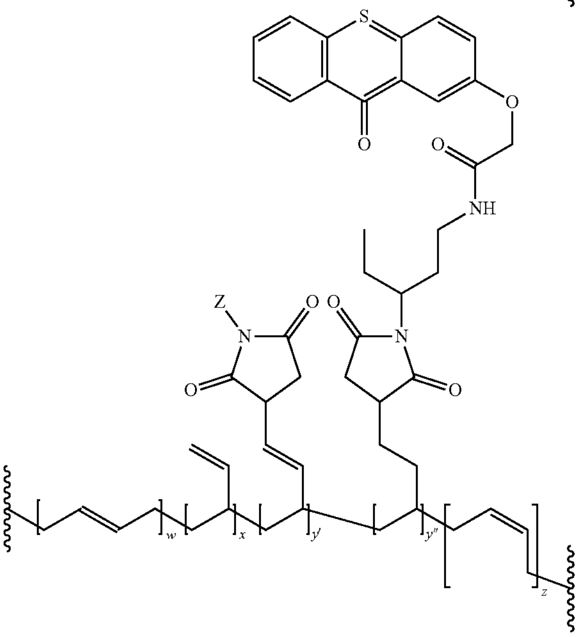
wherein w, x, y, y', y" and z are integers from 1 to 100; Z is either: (1) a moiety that does not comprise an Ar group as defined above or (2) an alkyl, a cycloalkyl or a polyether moiety.
19. A photocurable composition comprising the imide-linked photoinitiator of claim 1.
* * * * *